US012404595B2

(12) United States Patent
Tahmasebi et al.

(10) Patent No.: US 12,404,595 B2
(45) Date of Patent: Sep. 2, 2025

(54) ELECTROCHEMICAL METHOD, APPARATUS AND SYSTEM WITH IMPROVED PRODUCTION EFFICIENCY AND $CO_2$ SEQUESTRATION

(71) Applicant: Planetary Hydrogen Inc., Dartmouth (CA)

(72) Inventors: Sadaf Tahmasebi, Halifax (CA); Gregory Hudson Rau, Castro Valley, CA (US)

(73) Assignee: Planetary Technologies Inc., Gatineau (CA)

( * ) Notice: Subject to any disclaimer, the term of this patent is extended or adjusted under 35 U.S.C. 154(b) by 848 days.

(21) Appl. No.: 17/541,172

(22) Filed: Dec. 2, 2021

(65) Prior Publication Data

US 2022/0170171 A1 Jun. 2, 2022

Related U.S. Application Data

(60) Provisional application No. 63/120,368, filed on Dec. 2, 2020.

(51) Int. Cl.
*C25B 15/08* (2006.01)
*B01D 53/32* (2006.01)
(Continued)

(52) U.S. Cl.
CPC ............ *C25B 15/08* (2013.01); *B01D 53/323* (2013.01); *C25B 1/14* (2013.01); *C25B 9/19* (2021.01);
(Continued)

(58) Field of Classification Search
CPC .. C25B 15/08; C25B 1/14; C25B 9/19; C25B 15/023; C25B 15/029; C25B 15/031;
(Continued)

(56) References Cited

U.S. PATENT DOCUMENTS 3,944,474 A 3/1976 Verlaeten
4,080,270 A 3/1978 O'Leary
(Continued)

FOREIGN PATENT DOCUMENTS

CA 2786682 7/2011
DE 140261 2/1980
(Continued)

OTHER PUBLICATIONS

Jessica L. Hamilton, Siobhan A. Wilson; Bree Morgan, Anna L. Harrison, Connor C. Turvey, David J. Paterson, Gregory M. Dipple, Gordon Southam, "Accelerating Mineral Carbonation in Ultramafic Mine Tailings via Direct CO2 Reaction and Heap Leaching with Potential for Base Metal Enrichment and Recovery," Journal of Exonomic Geology (2020), 115(2): 303-323.
(Continued)

*Primary Examiner* — Lindsay M Low
*Assistant Examiner* — Charles J Brauch
(74) *Attorney, Agent, or Firm* — IP-MEX Inc.; Victoria Donnelly

(57) ABSTRACT

The present invention describes ways of increasing the production efficiency of a saline water electrolysis cell and of consuming $CO_2$ gas and sequestering it from the atmosphere. This is achieved by the introduction of $CO_2$ gas into the catholyte of the electrolysis, where reaction of the $CO_2$ with the hydroxide ions present in the catholyte reduces the pH of the catholyte, thereby increasing production efficiency of the electrolysis cell. The preceding reaction forms bicarbonate and/or carbonate, thus sequestering the reactant $CO_2$ gas from the atmosphere. The $CO_2$ gas may be introduced either directly into the cathode area of the electrolysis cell, or into the electrolyte prior to its introduction into the electrolysis cell. Corresponding apparatus is also provided.

25 Claims, 18 Drawing Sheets

(51) Int. Cl.
  *C25B 1/14* (2006.01)
  *C25B 9/19* (2021.01)
  *C25B 15/023* (2021.01)
  *C25B 15/029* (2021.01)
  *C25B 15/031* (2021.01)

(52) U.S. Cl.
  CPC .......... *C25B 15/023* (2021.01); *C25B 15/029* (2021.01); *C25B 15/031* (2021.01)

(58) Field of Classification Search
  CPC .... C25B 1/50; C25B 9/21; C25B 1/01; C25B 1/04; C25B 1/22; C25B 1/26; B01D 53/323; B01D 2257/504; B01D 53/326; Y02E 60/36
  See application file for complete search history.

(56) References Cited

U.S. PATENT DOCUMENTS

| | | | |
|---|---|---|---|
| 4,124,471 | A | 11/1978 | Lieb et al. |
| 4,197,421 | A | 4/1980 | Steinberg |
| 4,387,008 | A | 6/1983 | Winyall et al. |
| 4,707,234 | A | 11/1987 | Mori et al. |
| 5,386,838 | A | 2/1995 | Quincy, III et al. |
| 6,214,313 | B1 | 4/2001 | Berisko et al. |
| 7,604,787 | B2 | 10/2009 | Maroto-Valer et al. |
| 8,764,964 | B2 | 7/2014 | Rau |
| 8,834,688 | B2 | 9/2014 | Gilliam et al. |
| 10,005,029 | B2 | 6/2018 | Flynn |
| 10,113,407 | B2 | 10/2018 | Rau |
| 2005/0011770 | A1 | 1/2005 | Katsuyoshi et al. |
| 2005/0126923 | A1 | 6/2005 | Marsden et al. |
| 2006/0185985 | A1 | 8/2006 | Jones |
| 2008/0248350 | A1 | 10/2008 | Little |
| 2009/0003240 | A1 | 1/2009 | Negron et al. |
| 2009/0169452 | A1* | 7/2009 | Constantz ............... C01F 11/18 423/220 |
| 2012/0291675 | A1 | 11/2012 | Camire et al. |
| 2016/0362800 | A1 | 12/2016 | Ren et al. |
| 2017/0191173 | A1 | 7/2017 | Han et al. |
| 2020/0024757 | A1 | 1/2020 | Mani |

FOREIGN PATENT DOCUMENTS

| | | |
|---|---|---|
| JP | S61502525 | 11/1986 |
| JP | 2001334271 | 12/2001 |
| WO | 2008124538 | 10/2008 |
| WO | 2021061213 | 4/2021 |

OTHER PUBLICATIONS

Tongyan Li, "The Study of CO2 Removal in Slurries with Mg(OH)2 Suspended Particles and the Regeneration of Products," Ph.D Dissertation, University of Cincinnati, Nov. 18, 2015.

Jenine McCutcheon, Gregory M. Dipple, Siobhan A. Wilson, Gordon Southam, "Production of magnesium-rich solutions by acid leaching of chrysotile: A precursor to field-scale deployment of microbially enabled carbonate mineral precipitation," Journal of Chemical Geology, 413 (2015) 119-131.

Noah McQueen, Peter Kelemen, Greg Dipple, Phil Renforth, Jennifer Wilcox, "Ambient weathering of magnesium oxide for CO2 removal from air," Journal of Nature Communications, (2020) 11:3299.

Yoshihiko Sano, YiJia Hao, Fujio Kuwahara, "Development of an electrolysis based system to continuously recover magnesium from seawater," Heliyon Journal (Elsevier), (2018) 2405-8440.

Allan Scott, Christopher Oze, Vineet Shah, Nan Yang, Barney Shanks, Chris Cheeseman, Aaron Marshall, Matthew Watson, "Transformation of abundant magnesium silicate mineral for enhanced CO2 sequestration," Journal of Communications Earth & Environment, (2021) 2:25.

Lu Lu, Zhe Huang, Greg H. Rau, Zhiyong Jason Ren, "Microbial Electrolytic Carbon Capture for Carbon Negative and Energy Positive Wastewater Treatment," Environmental Science & Technology, Jun. 2015, 49, 8193-8201, <online: https://doi:10.1021/acs.est.5b00875>.

Lu Lu, Jeremy S. Guest, Catherine A. Peters, Xiuping Zhu, Greg H. Rau, Zhiyong Jason Ren, "Wastewater treatment for carbon capture and utilization," Nature Sustainability, Dec. 2018, vol. 1, 750-758, <online: https://doi.org/10.1038/s41893-018-0187-9>.

* cited by examiner

ELECTROCHEMICAL METHOD, APPARATUS AND SYSTEM WITH IMPROVED PRODUCTION EFFICIENCY AND $CO_2$ SEQUESTRATION

CROSS REFERENCE TO RELATED APPLICATIONS

The present application claims benefit from the U.S. provisional application 63/120,368 filed Dec. 2, 2020, the entire contents of which are incorporated herein by reference.

FIELD OF THE INVENTION

The present invention generally relates to sequestering $CO_2$ using electrolysis, and in particular to an electrochemical method and apparatus with improved production efficiency and use thereof for sequestering $CO_2$.

BACKGROUND OF THE INVENTION

It is of interest to increase the production efficiency of electrolytic processes considering the important and growing role they play in providing commercial goods and services. The electrolytic production of hydrogen ($H_2$), an important fuel, chemical feedstock and energy storage medium is a prime example wherein the use of non-fossil-derived electricity in the electrolysis can significantly reduce the $CO_2$ emissions normally associated with $H_2$ production, and thus reduce the deleterious effects of adding $CO_2$ to the atmosphere. It is therefore desirable to seek methods of making this process more production efficient and thus less expensive.

Furthermore, it is of interest to consume and sequester $CO_2$ gas that would otherwise be emitted to the atmosphere or that already resides in the atmosphere. It has been shown that chemical bases that include hydroxides can be useful in reacting $CO_2$ out of waste gas streams or air. The end products of such reaction are bicarbonate and/or carbonate in dissolved or solid form, and these products can have significant commercial value and they can act as effective storage media for the carbon that originates from $CO_2$ gas.

Methods are therefore sought for 1) improving production efficiency of electrolysis cell; 2) efficiently making hydroxides and reacting them with gas streams containing $CO_2$, 3) consuming $CO_2$, and 4) making bicarbonates and carbonates.

SUMMARY OF THE INVENTION

It is an object of the present invention to increase the production efficiency of saline water electrolysis as well as reduce the $CO_2$ burden in the atmosphere. Specifically, the present invention provides an electrolytic cell and a method for improving production efficiency of the electrolytic cell by reducing the pH of catholyte via the introduction and dissolution of an acid gas, $CO_2$, into the cell's catholyte. The reaction of the dissolved $CO_2$ with the hydroxide ions ($OH^-$) that is produced at the cell's cathode consumes at least some of the catholyte's $OH^-$, lowering catholyte pH and producing bicarbonate and/or carbonate anions balance by cations supplied by the salt used in the electrolyte. In this way the production efficiency or productivity of the electrolysis is increased, bicarbonate and/or carbonate are produced, and $CO_2$ that would otherwise be emitted to the atmosphere or that resides in the atmosphere is consumed and sequestered from the atmosphere.

According to one aspect of the invention, there is provided a method of improving production efficiency of a water electrolysis cell while sequestering $CO_2$ gas, the production efficiency being measured by the quantity of a product per unit of time produced by the electrolysis cell per volt of electrical potential applied between the cathode and anode of the cell or per watt of power used by the cell, the product being selected from the group consisting of a gas formed at the cathode, a gas formed at the anode, acid, a carbonate, and a bicarbonate, the method comprising:

introducing $CO_2$ gas into a catholyte containing $OH^-$ ions, comprising introducing the $CO_2$ gas at a rate, resulting in a reduced pH level of the catholyte, but not exceeding a rate leading to a substantially total consumption of the $OH^-$ ions, the $CO_2$ gas reacting with the $OH^-$ ions to form one or more of the bicarbonate and carbonate; and conducting the electrolysis with the catholyte having the reduced pH level; thereby improving the production efficiency of the electrolysis cell while sequestering the $CO_2$ gas.

The method further comprises controlling the rate of the introducing the $CO_2$ gas to achieve a predetermined pH level of the catholyte, thereby controlling an increase of the production efficiency of the electrolysis cell.

In the method described above, the controlling further comprises controlling a pH level of one or more of the following:

catholyte in the cathode area inside the electrolysis cell;
catholyte removed from the cathode area of the electrolysis cell.

In the method described above, the controlling comprises controlling the rate of the introducing the $CO_2$ gas so as to achieve a predetermined value of a control variable, wherein the control variable is one or more of the following:

PH level of an electrolyte of the electrolysis cell;
voltage of the electrolysis cell;
current of the electrolysis cell;
concentration of the $CO_2$ in a gas stream;
concentration of $CO_2$ in the catholyte;
concentration of $CO_2$ in the catholyte removed from the cell;
concentration of $CO_2$ in the electrolyte;
quantity of the product produced per unit time.

In the method described above, the introducing comprises introducing the $CO_2$ gas into the catholyte in a cathode area of the electrolysis cell.

In the method described above, the introducing comprises introducing the $CO_2$ gas into an electrolyte prior to introduction of the electrolyte into the electrolysis cell.

In the method described above, the conducting comprises conducting saline water electrolysis, with saline water containing a salt dissolved in water, the dissolved salt being selected from the group of salts whose cations consist of:

ammonium, calcium, iron, magnesium, potassium, sodium, or copper cations; and
carbonate, chloride, nitrate, phosphate, or sulfate anions.

In the method described above, the conducting comprises conducting saline water electrolysis, with saline water containing a salt dissolved in water, the dissolved salt containing one or more of the following:

sodium sulfate; sodium nitrate; sodium phosphate, sodium carbonate; potassium sulfate; potassium nitrate; potassium phosphate; potassium carbonate.

In the method described above, the introducing comprises contacting the catholyte with a gas stream containing $CO_2$.

In the method described above, the reduced pH level is from about pH=14 to about pH=7. Alternatively, the reduced pH level is from about pH=12 to about pH=8. Yet alternatively, the reduced pH level is from about pH=11 to about pH=9. Yet further alternatively, the reduced pH level is from about pH=10 to about pH=8.

In the method described above, the product is selected from the group consisting of $H_2$, $O_2$, $Cl_2$, and acid.

In the method described above, the conducting comprises conducting the electrolysis in the electrolysis cell having at least one ion-exchange membrane disposed between cathode and anode and defining a cathode area and an anode area; and
the introducing comprises introducing the $CO_2$ gas into the cathode area in a close proximity to the cathode.

In the method described above, the conducting comprises conducting the electrolysis in the electrolysis cell having a cation exchange membrane and an anion exchange membrane disposed in the electrolysis cell between cathode and anode and defining a cathode area, an anode area, and a central area therebetween; and
the introducing comprises introducing the $CO_2$ gas into one or more of the cathode area and the central area.

In the method described above, the $CO_2$ gas is derived from one or more of the following: the atmosphere; a waste stream; biomass; soil; the ocean; a fossil source.

In the method described above, the production efficiency of the electrolysis cell is increased up to about 30%.

According to another aspect of the invention, there is provided an apparatus for improving production efficiency of a water electrolysis cell while sequestering $CO_2$ gas, the production efficiency being measured by the quantity of a product per unit of time produced by the electrolysis cell per volt of electrical potential applied between the cathode and anode of the cell or per watt of power used by the cell, the product being selected from the following: a gas formed at the cathode, a gas formed at the anode, acid, a carbonate, and a bicarbonate, the apparatus comprising:
a means for introducing $CO_2$ gas into a catholyte containing $OH^-$ ions, comprising introducing the $CO_2$ gas at a rate, resulting in a reduced pH level of the catholyte, but not exceeding a rate leading to a substantially total consumption of the $OH^-$ ions, the $CO_2$ gas reacting with the $OH^-$ ions to form one or more of the bicarbonate and carbonate; and
a means for conducting the electrolysis with the catholyte having the reduced pH level; thereby improving the production efficiency of the electrolysis cell while sequestering the $CO_2$ gas.

The apparatus further comprises means for controlling the rate of the introduction of the $CO_2$ gas to achieve a predetermined pH level of the catholyte, thereby controlling an increase of the production efficiency of the electrolysis cell.

In the apparatus described above, the means for controlling further comprises means for controlling a pH level of one or more of the following:
catholyte in the cathode area inside the electrolysis cell;
catholyte removed from the cathode area of the electrolysis cell.

In the apparatus described above, the means for controlling comprises means for controlling the rate of the introducing the $CO_2$ gas so as to achieve a predetermined value of a control variable, wherein the control variable is one or more of the following:
pH level of an electrolyte of the electrolysis cell;
current of the electrolysis cell;
voltage applied to the electrolysis cell;
concentration of the $CO_2$ in a gas stream;
concentration of $CO_2$ in the catholyte;
concentration of $CO_2$ in the catholyte removed from the cell;
concentration of $CO_2$ in the electrolyte;
quantity of the product produced per unit time.

In the apparatus described above, the means for introducing comprises a means for introducing the $CO_2$ gas into the catholyte in a cathode area of the electrolysis cell.

In the apparatus described above, the means for introducing comprises a means for introducing the $CO_2$ gas into an electrolyte prior to introduction of the electrolyte into the electrolysis cell.

In the apparatus described above, the water electrolysis cell contains saline water having a salt dissolved therein, the salt being selected from the group of salts which ions consist of:
ammonium, calcium, iron, magnesium, potassium, sodium, or copper cations; and
carbonate, chloride, nitrate, phosphate, or sulfate anions.

In the apparatus described above, the water electrolysis cell contains saline water having a salt dissolved therein, the salt containing one or more of the following:
sodium sulfate; sodium nitrate; sodium phosphate, sodium carbonate; potassium sulfate; potassium nitrate; potassium phosphate; potassium carbonate.

In the apparatus described above, the means for introducing comprises means for contacting a gas stream containing $CO_2$ with the catholyte.

In the apparatus described above, the reduced pH level is from about pH=14 to about pH=7. Alternatively, the reduced pH level is from about pH=12 to about pH=8. Yet alternatively, the reduced pH level is from about pH=11 to about pH=9. Yet further alternatively, the reduced pH level is from about pH=10 to about pH=8.

In the apparatus described above, the product is selected from the group consisting of $H_2$, $O_2$, $Cl_2$, and acid.

In the apparatus described above, the electrolysis cell has at least one ion-exchange membrane disposed between cathode and anode and defining a cathode area and an anode area; and
the means for introducing is configured to introduce the $CO_2$ gas into the cathode area in a close proximity to the cathode.

In the apparatus described above, the electrolysis cell has a cation exchange membrane and an anion exchange membrane disposed in the electrolysis cell between cathode and anode and defining a cathode area, an anode area, and a central area therebetween; and
the means for introducing is configured to introduce the $CO_2$ gas into one or more of the cathode area and the central area.

In the apparatus described above, the $CO_2$ gas is derived from one or more of the following: the atmosphere; a waste stream; biomass; soil; the ocean; a fossil source.

In the apparatus described above, the production efficiency of the electrolysis cell is increased up to about 30%.

According to yet another aspect of the invention, there is provided an electrochemical system with improved production efficiency and sequestration of the $CO_2$ gas, the production efficiency being measured by the quantity of a product per unit of time produced by the electrochemical system per volt of electrical potential applied between the cathode and anode of the cell or per watt of power used by the cell, the product being selected from the following: a gas formed at the cathode, a gas formed at the anode, acid, a carbonate, and a bicarbonate, the system comprising:
- a means for introducing $CO_2$ gas into a catholyte containing $OH^-$ ions, comprising introducing the $CO_2$ gas at a rate that results in a reduced pH level of the catholyte, but not exceeding a rate leading to total consumption of the $OH^-$ ions, the $CO_2$ gas reacting with the $OH^-$ ions to form one or more of the bicarbonate and carbonate;
- a means for conducting the electrolysis with the catholyte having the reduced pH level; and
- a means of controlling the rate of the introducing the $CO_2$ gas to achieve a predetermined value of a control variable;
- thereby improving the production efficiency of the electrolysis cell while sequestering the $CO_2$ gas.

Thus, a system, an apparatus and a method with improved production efficiency and sequestration of the $CO_2$ gas have been provided.

BRIEF DESCRIPTION OF THE DRAWINGS

The accompanying drawings, which constitute a part of the specification, illustrate specific embodiments of the invention and, together with the detailed description of the specific embodiments, serve to explain the principles of the invention.

DESCRIPTION OF EMBODIMENTS OF THE INVENTION

Terminology

Figure 1:
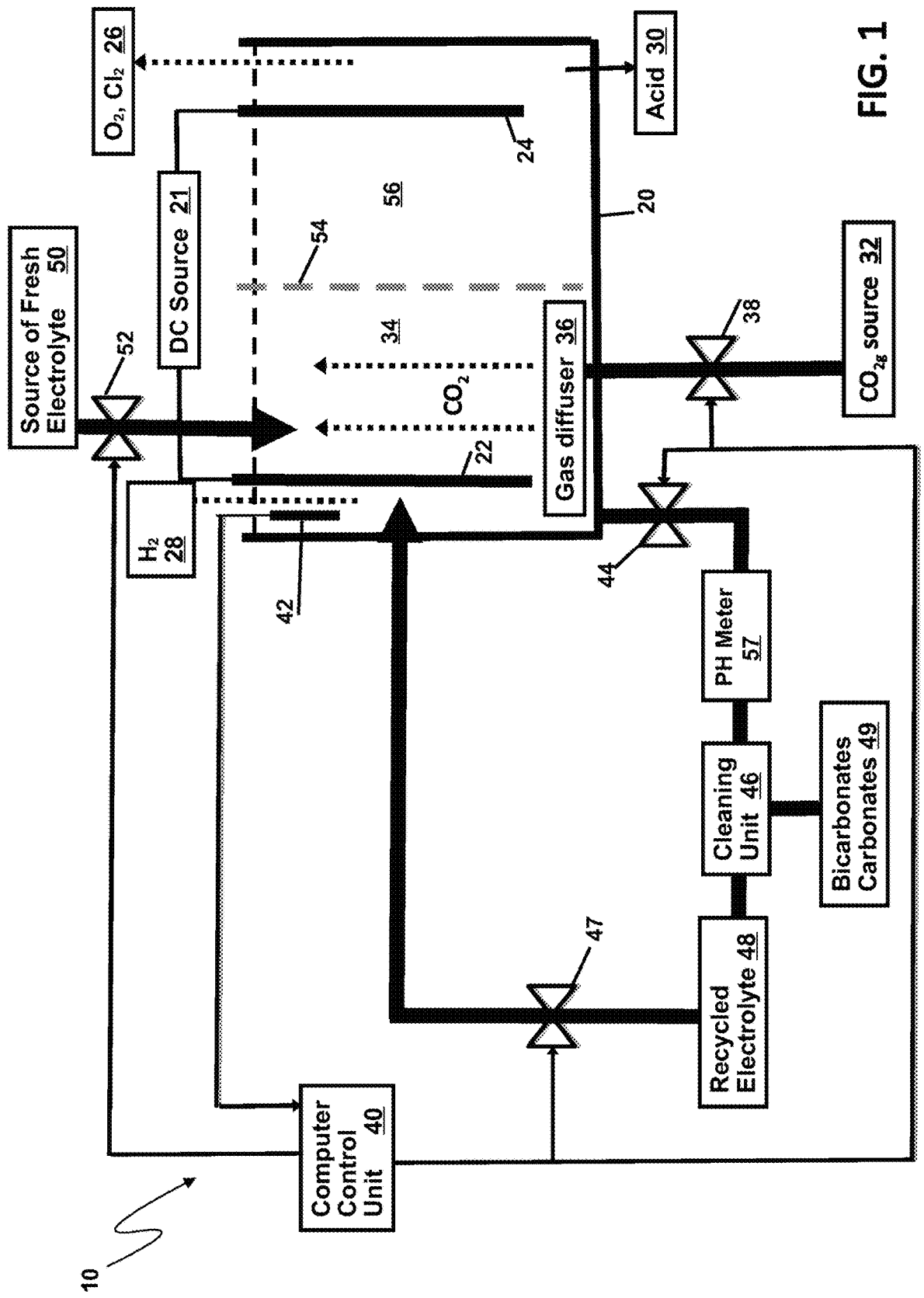
FIG. 1 shows an electrochemical system 10 of one embodiment of the present invention, with the introduction of the $CO_2$ into the catholyte inside an electrolysis cell 20.

For convenience, a list of most frequently used terms in the application are listed below.
- 10: an electrochemical system of a first embodiment
- 20: electrolysis cell
- 20a: one arrangement of the electrolysis cell 20, with the introduction of the $CO_2$ gas into the catholyte inside the cell
- 20b: another arrangement of the electrolysis cell 20 with cation exchange membrane
- 20c: yet another arrangement of the electrolysis cell 20 with cation and anion exchange membranes
- 20d: yet another arrangement of the electrolysis cell with the introduction of the $CO_2$ gas into the electrolyte outside of the cell
- 21: source of direct current
- 22: cathode
- 24: anode
- 26: oxygen gas and associated storage means
- 28: hydrogen gas and associated storage means
- 30: acid solution and associated storage means
- 32: source of $CO_2$ gas
- 34: cathode area, or catholyte chamber, or catholyte area
- 36: gas diffuser
- 38: gas flow controller
- 40: computer control unit
- 42: pH sensor
- 44: drain valve
- 46: cleaning unit
- 47: valve for controlling supply of recycled electrolyte back into the electrolysis cell 20
- 48: recycled electrolytes
- 49: carbonate, bicarbonate and associated storage means
- 50: source of fresh electrolyte
- 52: electrolyte control valve for supplying the electrolyte into the electrolysis cell
- 53: valve for controlling supply of fresh electrolyte into a mixer
- 54: cation exchange membrane, CEM
- 56: anolyte chamber, or anode area, or anolyte area
- 57: pH meter or pH sensor
- 58: anion exchange membrane, AEM
- 60: central area, or electrolyte chamber, or central chamber
- 70: mixer
- 72: carbonated electrolyte 602: water
604: soluble metal salt The thermodynamic study of the reaction of $CO_2$ with $OH^-$ and our observations in the experimental work indicate that introduction of $CO_2$ gas into the electrolyte that is circulating in the cathode compartment/area of a saline water electrolysis cell, catholyte including hydroxide ion products, increases the production efficiency of $H_2$, $O_2$, an acid, an intermediate hydroxide that may be ultimately converted to bicarbonate or carbonate.

This can be achieved by reducing the pH in the catholyte and this can be affected by the neutralization of the $OH^-$ produced in the catholyte with an acid such as carbonic acid that is spontaneously formed when $CO_2$ is added to the catholyte. Neutralizing the produced $OH^-$ by addition of $CO_2$ to the catholyte decreases the cell voltage potential which is related to the pH according to the Nernst equation ($E=E°-0.059$ pH), moreover, this would result in a decrease in the energy required for water splitting.

This effect applies to any salt saline water electrolysis process where the cations formed from the dissolution of the salt in water may include, but are not limited to, ammonium, calcium, iron, magnesium, potassium, sodium and copper, and the anions formed from the dissolution of the salt may include but are not limited to carbonate, chloride, nitrate phosphate and sulfate.

FIG. 1 shows an electrochemical system 10 with improved production efficiency according to one embodiment of the present invention, comprising a water electrolysis cell 20 with the sequestration of $CO_2$ gas.

The production efficiency is measured by the quantity of a product per unit of time produced by an electrolysis cell per volt of electrical potential applied between the cathode and anode of the cell or per watt of power used by the cell.

The product is selected from one or more of the following: acid, a carbonate, a bicarbonate, a gas formed at a cathode 22 of the electrolysis cell 20, for example hydrogen gas, and a gas formed at an anode 24 of the electrolysis cell, for example oxygen gas or chlorine gas.

Alternatively, the production efficiency may be measured by the quantity of a product produced by the electrolysis cell 20 per unit of time, for example, per second, per minute, per hour etc.

The increase in the production efficiency of the electrolysis cell 20 is defined as a ratio of the quantity of the product produced by the electrolysis cell 20 in the presence of the sequestration of $CO_2$ gas (quantity2) in the electrolysis cell 20, to the quantity of the product produced by the electrolysis cell 20 without the sequestration of the $CO_2$ gas in the electrolysis cell 20 (quantity1). Alternatively, the increase in the production efficiency may be expressed as the ratio of the difference between (quantity2−quantity1)/quantity1, which may be also conveniently expressed as a percentage. Relative change in cell amperage, A, can also be used as a measure of increase in production efficiency of the cell with the application of $CO_2$ versus no application of $CO_2$, $A_{CO2}/A_{no\ CO2}$, where $V_{CO2}=V_{no\ CO2}$.

The electrochemical system 10 comprises an electrolysis cell 20 which is filled with a conductive electrolytic solution, or electrolyte solution, containing an electrolyte, for example a metal salt dissolved in a water, such that when the direct current (DC) from a DC source is applied to the anode 24 and the cathode 22, oxygen or another oxidative gas is generated at the anode 24 and removed (storage means 26) from the electrolysis cell 20, and hydrogen gas is generated at the cathode 22 and removed (storage means 28) from the electrolysis cell 20 in a well-known manner. Also acid is formed at the anode 24 and removed (storage means 30) from the electrolysis cell 20.

In addition to the traditional electrolysis process conducted in the electrolysis cell 20, a stream of $CO_2$ gas from a $CO_2$ source 32 is introduced into the catholyte in a cathode area 34 of the electrolysis cell.

Methods of dissolving $CO_2$ into the electrolyte or catholyte solution can include those methods of gas-liquid contacting known in the art. In the case of $CO_2$ contacting of the catholyte within the electrolysis cell 20, $CO_2$ gas may be introduced at the bottom of the catholyte/cathode area or chamber 34 and enter the solution through a gas diffuser 36 whose porosity allows for the formation of bubbles that rise through the solution, facilitating the dissolution of some or all of the $CO_2$ into the solution. The smaller the size of the gas bubbles the gas diffuser 36 can deliver the greater the gas-liquid contacting surface area, and the more $CO_2$ can be dissolved into solution. The bubble stream delivered by the gas diffuser 36 should be positioned in close proximity to the cathode 22 in order to facilitate the reaction of the dissolved $CO_2$ with the $OH^-$ produced at the cathode 22, thus reducing the pH of the catholyte and forming carbonates and/or bicarbonates, partly in soluble form and partly as sediments.

The rate of $CO_2$ gas introduction and dissolution into the solution determines the quantity of $OH^-$ that can be consumed, and thus the degree of catholyte pH reduction is increased and the amount of bicarbonate and/or carbonate formed. The rate of $CO_2$ gas introduction can be controlled by a gas flow controller 38 such as a manual or automatically actuated gas control valve 38 that can be adjusted to maintain the desired solution pH. The gas control valve 38 is controlled by a computer control unit 40.

A pH sensor 42 measure the current pH level in the catholyte inside the cathode area 34 and sends the measurement to the computer control unit 40.

A drain valve 44 controls drainage of the electrolyte from the electrolysis cell 20 upon receiving a signal from the computer control unit 40, to drain the catholyte into a cleaning unit 46 to separate the electrolyte from other components to produce a recycled and electrolyte 48. Carbonates and/or bicarbonates are stored in a storage means 49 for further use and distribution. The recycled electrolyte 48 is returned back to the electrolysis cell 20 to partially replenish the electrolyte that was drained, which may be controlled by another valve 47, which also may be controlled by the computer control unit 40. Alternatively, the electrolyte removed from the electrolysis cell 10 may be used elsewhere or discarded. Conveniently, another pH sensor/meter 57 can measure the pH of the catholyte removed from the electrolysis cell 20.

Additionally, a fresh electrolyte may be added to the electrolysis cell 20 from an a source of fresh electrolyte 50, which amount is controlled by an electrolyte control valve 52, which is controlled by the computer control unit 40.

Thus, the electrolysis cell 20 and the electrochemical system 10 with improved production efficiency of generation of an output product, for example hydrogen gas, have been provided.

Figure 2:
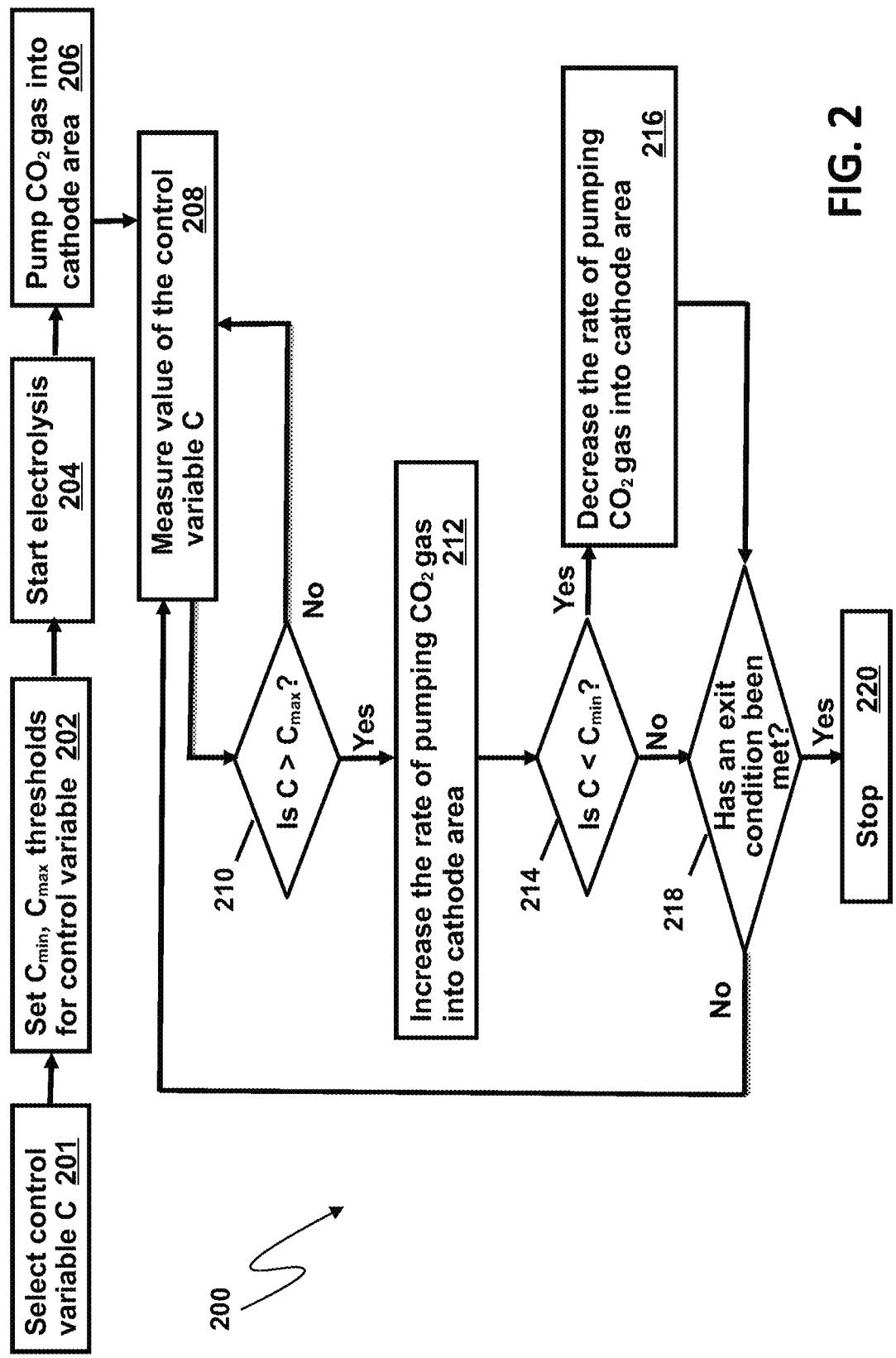
FIG. 2 shows a flow-chart 200 illustrating operation of the electrochemical system 10 of FIG. 1.

FIG. 2 shows a flow-chart 200 illustrating operation of the electrochemical system 10 of FIG. 1, when the $CO_2$ gas is pumped/introduced directly into the cathode area 22 of the electrolysis cell 20.

First, a control variable C is selected (step 201), followed by setting predetermined minimal $C_{min}$ and maximal $C_{max}$ threshold values for the control variable C (step 202).

For exemplary purposes and for the sake of simplicity, further description of the flow chart 200 will be presented for the control variable selected as pH of the catholyte in the cathode area 34 inside the electrolysis cell 20. Upon starting the electrolysis process (step 204), the $CO_2$ gas is pumped into the cathode area 34 of the electrolysis cell 20, followed by measuring the pH of the catholyte in the cathode area 34 (step 208).

If the measured pH does not exceed $pH_{max}$, which is the maximal $C_{max}$ threshold value for the control variable C (exit No from Step 210), the method returns back to the step 208 and continues measuring the pH of the catholyte. If the measured pH exceeds $pH_{max}$ (exit Yes from step 210), increase the rate of pumping of the $CO_2$ gas into the cathode area 34 (step 212), followed by the subsequent measurement of the pH in the cathode area 34.

If, after the increasing the pumping of the $CO_2$ gas, the measured pH is lower than $pH_{min}$, which is the minimal $C_{min}$ threshold value for the control variable C (exit Yes from step 214), decrease the rate of pumping of the $CO_2$ gas into the cathode area 34 (step 216), followed by checking if an exit condition has been met (step 218). The exit condition may be production of a predetermined amount of the product, for example $H_2$ or $O_2$, or a requirement to stop the operation of the electrolysis cell 20 for maintenance purposes, or else.

If the measured pH exceeds $pH_{min}$ (exit No from step 214), check the exit condition (step 218). If the exit condition has not been met (exit No from step 218), the method returns back to the step 208, and the steps 208-218 are repeated. If the exit condition has been met (exit Yes from step 218), the method is terminated (step 220).

Control of the gas flow can be dictated by the pH of the bulk catholyte or electrolyte, or the pH of the solution removed from the cathode area 34, the pH being measured by one or more sensors in the solution, for example pH sensor 54. Alternatively, gas flow can be controlled by monitoring cell current that can be used to provide a direct measure of increased production efficiency of the electrolysis cell 20.

Another determinant of $CO_2$ introduction rate is the concentration of the $CO_2$ in the gas stream. A gas stream composed of pure $CO_2$ gas will require less total gas flow to deliver a given quantity of dissolved $CO_2$ than a more diluted $CO_2$ gas stream. To the extent that the presence of gases other than $CO_2$ impede the performance of the electrolysis cell 20, a pure or highly concentrated $CO_2$ gas stream is preferred to maximize $CO_2$ dissolution per bubble quantity and minimize the introduction of impurities. If dilute $CO_2$ gas is used, it is preferable that the diluting gas be inert or otherwise not contain constituents that are detrimental to cell performance. For example, the gas should not contain $O_2$ or other oxidative gases in order not to reduce $H_2$ production or otherwise interfere with cell performance. Also, greater dissolution of $CO_2$ can be achieved when the total pressure of the solution is increased and/or temperature is decreased.

In summary, the following control variables C may be used, measuring:
- a pH level of the catholyte in the cathode area inside the electrolysis cell;
- a pH level of the catholyte removed from the cathode area of the electrolysis cell;
- a pH level of the electrolyte in the electrolysis cell;
- current of the electrolysis cell;
- voltage applied to the electrolysis cell;
- a concentration of the $CO_2$ in a gas stream;
- a concentration of $CO_2$ in the catholyte;
- a concentration of $CO_2$ in the catholyte removed from the cell;
- a concentration of $CO_2$ in the electrolyte; and/or
- a quantity of a product produced per unit time.

When other control variables are used in the method 200, apart from pH, for example, the current of the electrolysis cell 20, the concentration of the $CO_2$ in a gas stream, the concentration of $CO_2$ in the catholyte, the concentration of $CO_2$ in the catholyte removed from the cell, the concentration of $CO_2$ in the electrolyte, or the quantity of a product produced per unit time, either the conditions in the steps 210 and 214 have to be modified to read "Is $C<C_{max}$?" (step 210) and "Is $C<C_{min}$?" (step 214) instead of those recited in FIG. 2, or an inverse values of the control variables to be used in the method 200, for example an inverse of the current, or inverse of concentration of $CO_2$.

Another factor controlling the chemistry within the catholyte or electrolyte solution is the rate at which the solution is introduced into and removed from the catholyte or electrolyte chamber. To maintain a constant solution level, both input and output flows must be equal. This flow rate determines the residence time of the catholyte or electrolyte in the electrolysis cell 20 and thus can influences the degree to which chemical reactions have reached completion or equilibrium. The slower the solution flow through the chamber the more the solution will be hydroxylated and/or carbonated prior to existing the chamber. The rate at which the solution flows through the chamber can be controlled by a manual or automated valve, for example the drain valve 44 and the electrolyte control valve 52 of FIG. 1 as dictated by chemical or electrical conditions within the cell such as pH, voltage and current.

Figure 3:
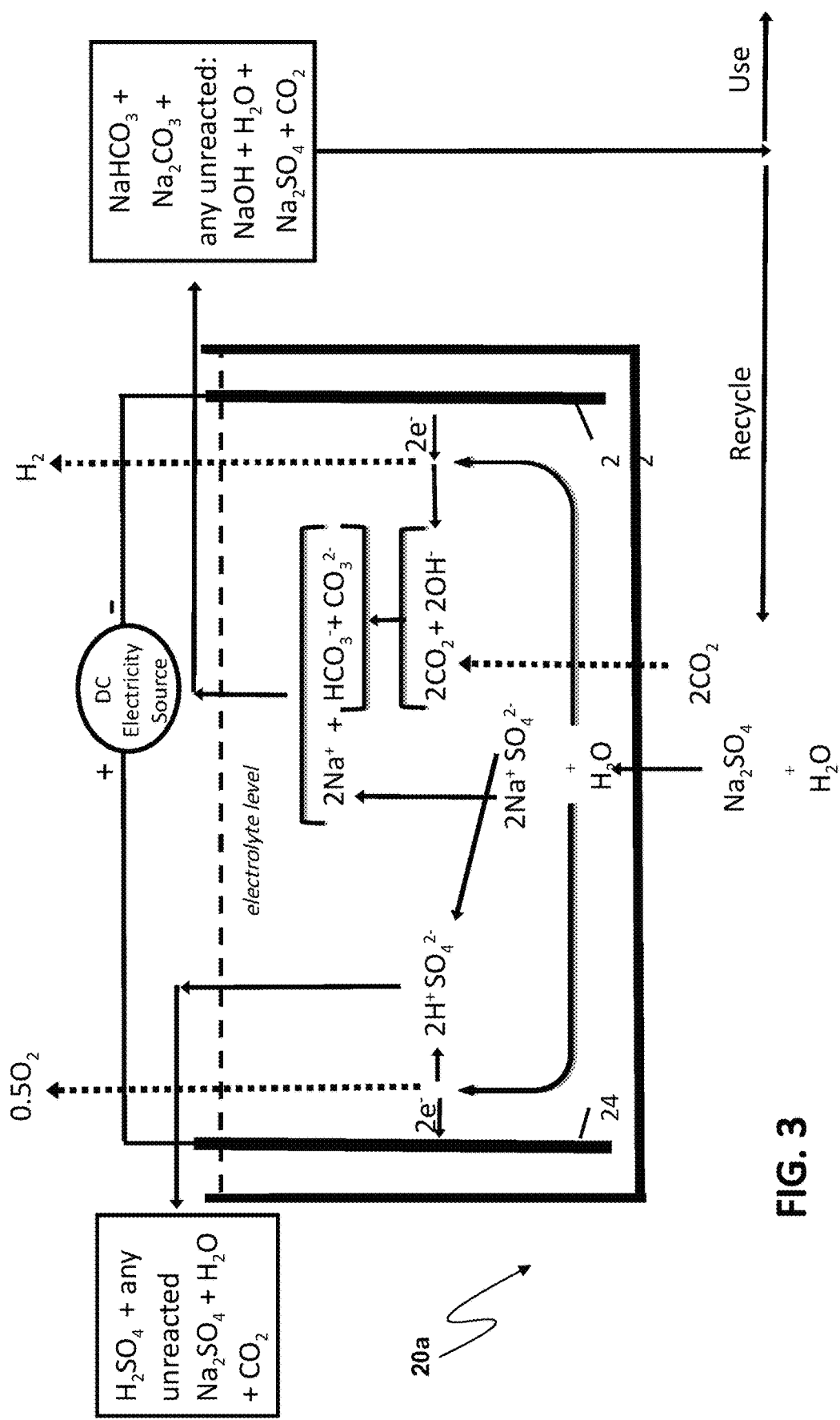
FIG. 3 illustrates principles of operation of the electrolysis cell 20 of the electrochemical system of FIG. 1.

FIG. 3 illustrates one arrangement 20a of the electrolysis cell 20. In FIG. 3, a dissolved and ionized alkaline metal salt, e.g., $Na_2SO_4$ ($2Na^+ + SO_4^{2-}$), is introduced into the electrolysis cell 20a containing the anode 24 and the cathode 22 with sufficient voltage applied to split water into $H_2$ and $OH^-$ at the cathode 22, and $O_2$ and $H^+$ at the anode 24. The $H^+$ is then charge-balanced by the $SO_4^{2-}$ to form dissolved $H_2SO_4$ (sulfuric acid) in the anolyte solution, the solution then being periodically or continuously removed for use or is discarded. $HCO_3^-$ and/or $CO_3^{2-}$ are formed in the catholyte via the injection and dissolution of $CO_2$ gas into the catholyte. The concentration of $CO_2$ in the injected gas stream and the rate of gas injection relative to the formation rate of $OH^-$ then dictates catholyte pH reduction and thus gain an increased production efficiency of the electrolysis cell 20a. The resulting pH of the catholyte also determines the relative proportion of $HCO_3^-$ and $CO_3^{2-}$ ions formed via direct reaction of the injected and dissolved $CO_2$ with $OH^-$ as formed at the cathode. The formation of $CO_3^{2-}$ will increasingly dominate as catholyte pH rises above 9 while HCO3- will increasingly dominate as pH is lowered below 9. The resulting $HCO_3^-$, $CO_3^{2-}$ and any unreacted $OH^-$ are charge-balanced by $Na^+$. The resulting catholyte solution is then periodically or continuously removed from the cell and recycled back into the electrolysis cell 20a, or is used or discarded, as described above with regard to FIG. 1.

Recycling is desirable if: 1) a significant quantity of $Na_2SO_4$ and/or NaOH has been unreacted, and/or 2) the concentration of carbonated products has not been maximized. Note that the preceding conversion of $CO_2$ to alkaline bicarbonate and/or carbonate can provide a method of capturing and storing $CO_2$ that would otherwise be deleteriously released to the atmosphere or otherwise resides in the atmosphere. In the case of removing $CO_2$ from the atmosphere it may be necessary to use biological and/or physiochemical methods known in the art to pre-concentrate the $CO_2$ prior to introduction into the catholyte so that a sufficient $CO_2$ concentration is supplied to the cell. The alkaline bicarbonates and carbonates produced can be in dissolved, ionic form or may precipitate as solids from solution. Precipitation generally is favored with the use of metal salt electrolytes whose metal ion has a valency of 2 or higher e.g., $Ca^{2+}$ or $Mg^{2+}$. In contrast, monovalent metal salts, such as those containing $Na^+$ (shown) or $K^+$, that produce metal bicarbonate and carbonate salts that are usually significantly more soluble in water and less inclined to precipitate than the case with those containing higher valency metals. In order to maintain a constant electrolyte level in the electrolysis cell 20a, withdrawal of anolyte and catholyte from the electrolysis cell 20a needs be balanced by the addition of fresh or recycled electrolyte, as described above with regard to FIG. 1.

Figure 4:
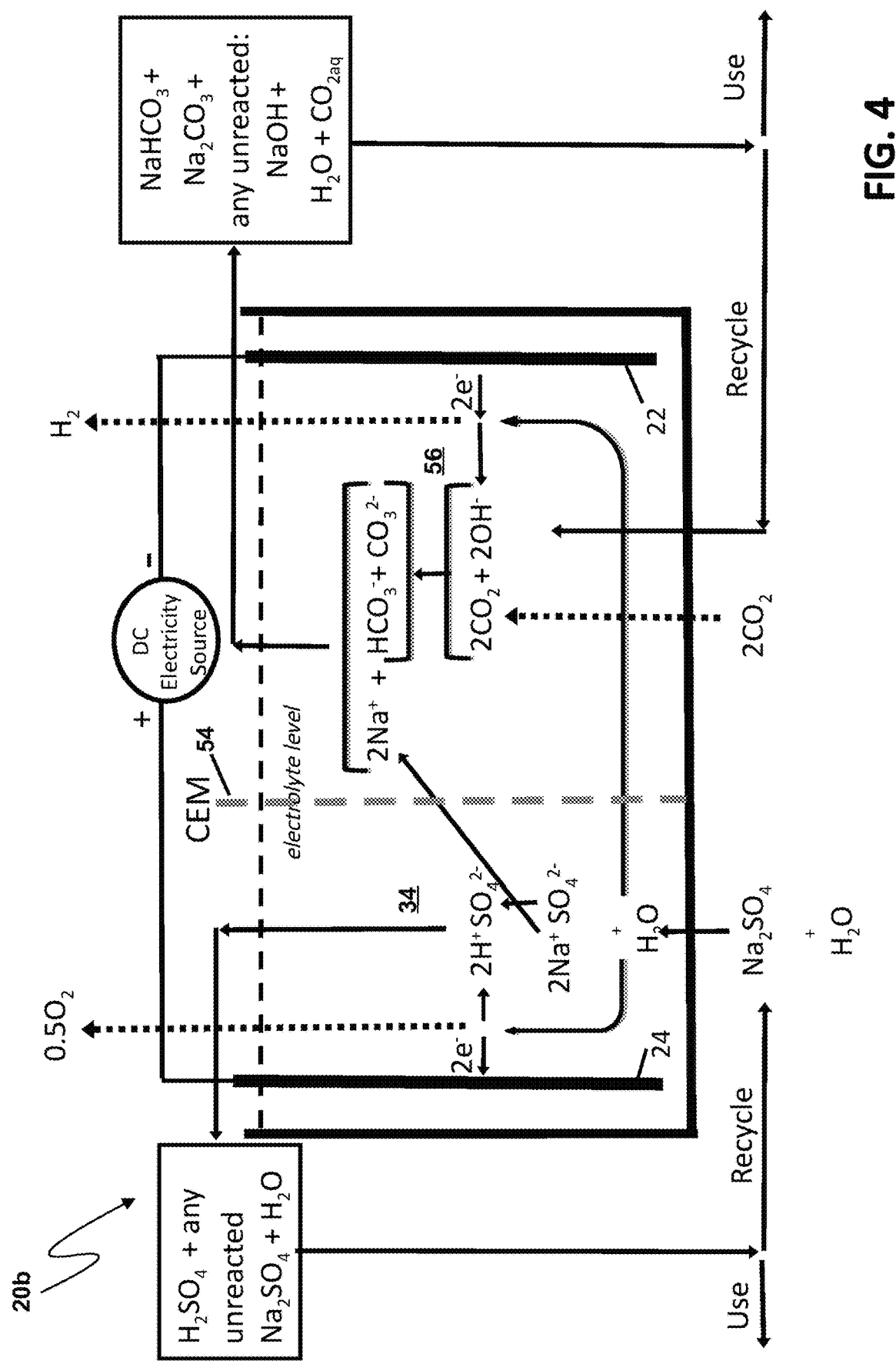
FIG. 4 illustrates another arrangement 20b of the electrolysis cell 20 with a cation exchange membrane.

FIG. 4 illustrates another arrangement 20b of the electrolysis cell 20. The electrolysis cell 20b of FIG. 4 is identical to the electrolysis cell 20a of FIG. 3 with the exception that a cation exchange membrane (CEM) 54 is used to separate the anolyte and catholyte and where the salt electrolyte solution is now introduced into an anode area or anolyte chamber 56 while $CO_2$ is introduced into the cathode area or catholyte chamber 34. In this way acid and base production are more physically separated, and the solutions withdrawn for the electrolysis cell 20a are in a purer or more concentrated form than in the absence of the membrane 54. This also allows the option of recycling the withdrawn anolyte back in the electrolysis cell 20b to facilitate more complete reaction of any unreacted $Na_2SO_4$ and $H_2O$ in the withdrawn solution.

Figure 5:
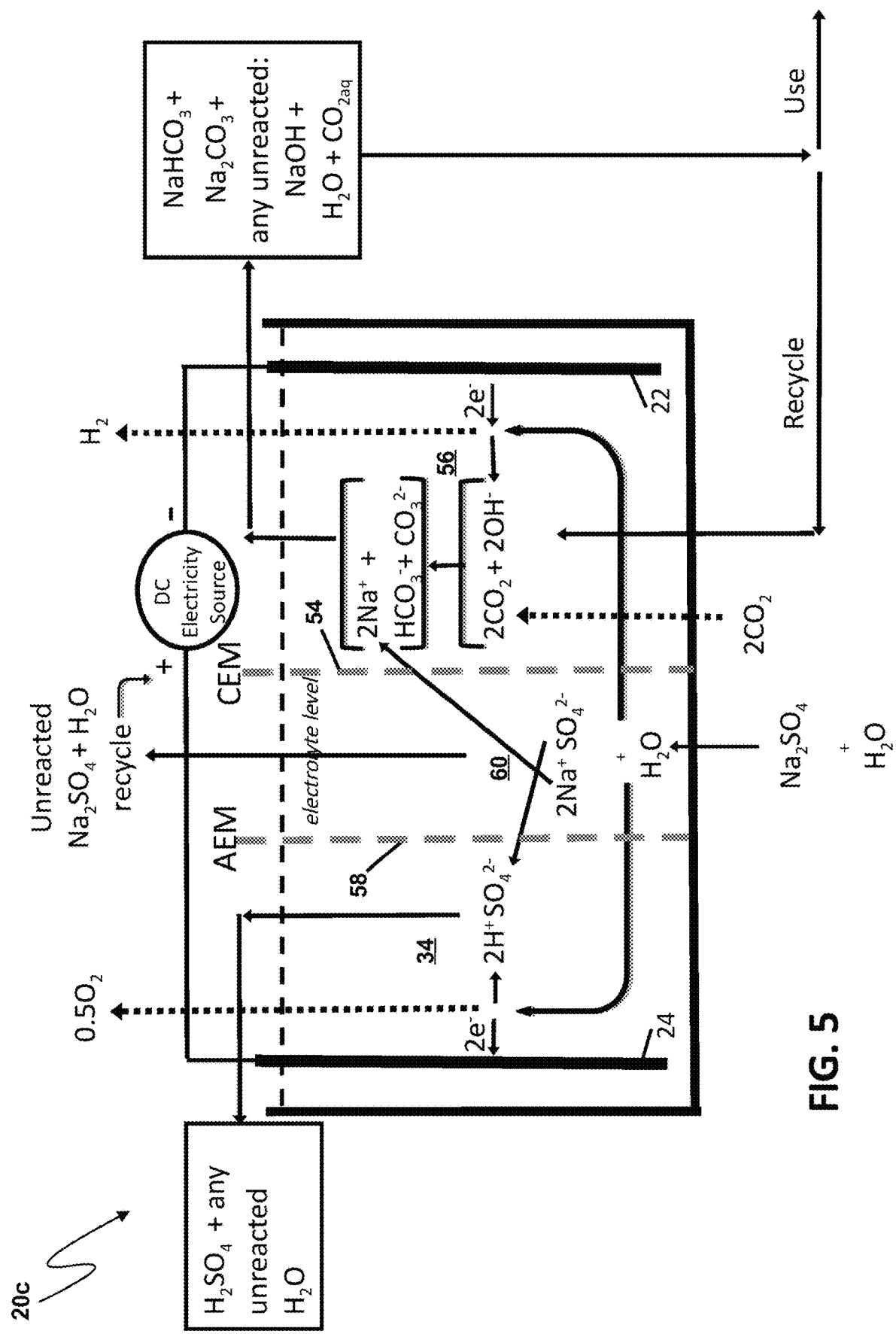
FIG. 5 illustrates yet another arrangement 20c of the electrolysis cell 20 with the cation exchange membrane and an anion exchange membrane.

FIG. 5 illustrates yet another arrangement 20c of the electrolysis cell 20.

The electrolysis cell 20c of FIG. 5 is identical to the electrolysis cell 20b of FIG. 4 with the exception that a second membrane, an anion exchange membrane (AEM) 60, is added to the electrolysis cell 20c between the CEM 54 and the anode 24 so as to now form a 3-compartment cell 20c having the anolyte chamber 56, a central area or electrolyte chamber 60, and the catholyte chamber 34. The salt electrolyte solution is now introduced into the center, electrolyte chamber 60, with the membranes 54 and 58 allowing even greater separation and cleaner production of the acid and the hydroxide, bicarbonate and/or carbonate. Unreacted metal salt solution exiting the center chamber 60 can be recycled back into the center chamber 60 to facilitate more complete reaction. $CO_2$ is injected into the catholyte chamber 34, or it can be injected into the electrolyte chamber 60 or into the electrolyte solution prior to entering electrolyte chamber 60 (as will be described in more detail below), if the CEM 54 allows sufficient $CO_2$ to pass into the catholyte chamber 34 to form metal bicarbonate and/or carbonate. Recycling of the solution withdrawn from the catholyte chamber 34 may be recycled back into the catholyte chamber 34 in order to further react water and any remaining unreacted NaOH, as has been described above with regard to FIG. 1.

Figure 6:
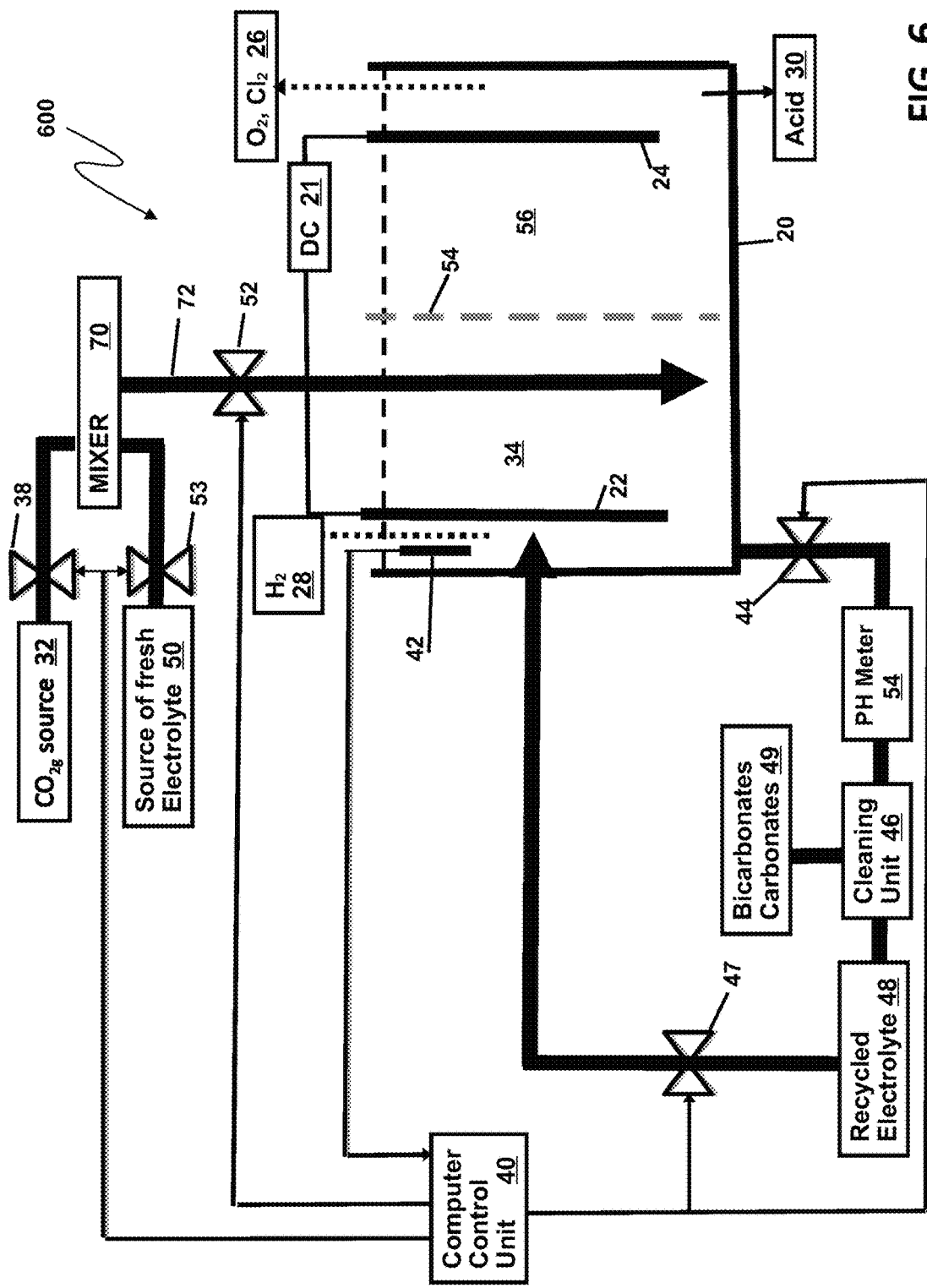
FIG. 6 shows an electrochemical system 600 of another embodiment of the present invention, with the introduction of the $CO_2$ intro the electrolyte outside of the electrolysis cell 20.

FIG. 6 shows an electrochemical system 600 of another embodiment of the present invention, where the electrolyte is carbonated prior to introduction into the electrolysis cell 20.

Similar elements are designated by the same reference numerals in both FIG. 1 and FIG. 6. FIG. 6 differs from FIG. 1 in that the CO2 source 32, valve 38 and gas diffuser 36 have been removed and replaced with another set of units configured to preliminary mix the electrolyte with the $CO_2$ gas reaching the cathode area 34 of the electrolysis cell 20.

Namely, the fresh electrolyte 50 is supplied to a mixer 70 via a control valve 53, which is controlled by the computer control unit 40. Also the $CO_2$ gas is supplied to the mixer 70 via the control valve 38, which is also controlled by the computer control unit 40 similar to that of FIG. 1.

The fresh electrolyte 50 being mixed with the $CO_2$ gas forms a carbonated electrolyte 72, which is supplied to the electrolysis cell 20 via a computer controlled valve 52.

Otherwise, the electrochemical system 600 is similar to that of FIG. 1.

In the case of carbonating the electrolyte prior to introduction into the electrolysis cell 20, it is understood that additional gas-liquid contacting methods may be used, including: 1) pumping the $CO_2$ gas into a container with the fresh electrolyte outside of the electrolysis cell, where a much taller solution container allowing a longer bubble path length and greater dissolution of $CO_2$ into solution than possible within the electrolysis cell 20 may be used, 2) spraying of the electrolyte solution into a container in the presence of $CO_2$ gas, 3) trickling of electrolyte through porous media in the presence of $CO_2$ gas, or 4) higher pressures or lower temperatures than can be maintained within the electrolysis cell 20.

Figure 7:
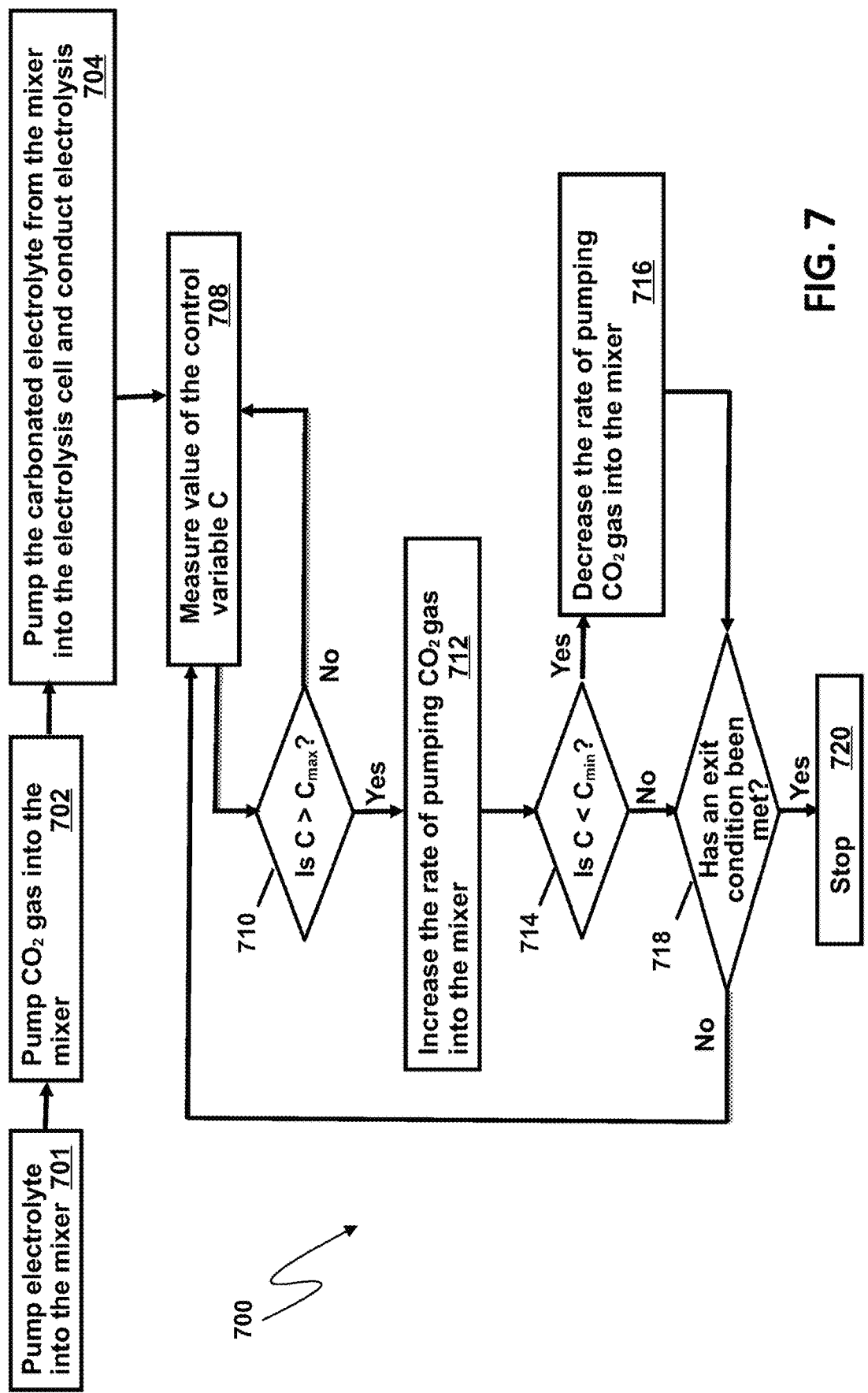
FIG. 7 illustrates operation of the electrochemical system of FIG. 6.

FIG. 7 shows a flow-chart 700 illustrating operation of the electrochemical system 610 of FIG. 6.

In the step 701 of FIG. 7, fresh electrolyte is pumped into the mixer 616, followed by the step 702 of pumping the $CO_2$ gas into the mixer 616 resulting in a mixture of electrolyte and the $CO_2$ gas further referred to as the carbonated electrolyte. In the step 704, the carbonated electrolyte is pumped into the electrolysis cell 620.

In the step 708 value of a control variable is measured. For exemplary purposes and for the sake of simplicity, further description of the flow chart 700 will be presented for the control variable selected as pH of the catholyte in the cathode area 634 inside the electrolysis cell 620.

If the measured pH does not exceed $pH_{max}$, which is the maximal $C_{max}$ threshold value for the control variable C (exit No from Step 710), the method returns back to the step 708 and continues measuring the pH of the catholyte. If the measured pH exceeds $pH_{max}$ (exit Yes from step 710), increase the rate of pumping of the $CO_2$ gas from the $CO_2$ storage 614 into the mixer 616 (step 712), followed by the subsequent measurement of the pH in the cathode area 634.

If, after the increasing the pumping of the $CO_2$ gas, the measured pH is lower than $pH_{min}$, which is the minimal $C_{min}$ threshold value for the control variable C (exit Yes from step 714), decrease the rate of pumping of the $CO_2$ gas into the mixer 616 (step 716), followed by checking if an exit condition has been met (step 718). The exit condition may be production of a predetermined amount of the product, for example $H_2$ or $O_2$, or a requirement to stop the operation of the electrolysis cell 620 for maintenance purposes, or else.

If the measured pH exceeds $pH_{min}$ (exit No from step 714), check the exit condition (step 718). If the exit condition has not been met (exit No from step 718), the method returns back to the step 708, and the steps 708-718 are repeated. If the exit condition has been met (exit Yes from step 718), the method is terminated (step 720).

Control of the gas flow can be dictated by the pH of the bulk catholyte or electrolyte, or the pH of the solution removed from the cathode area 634, the pH being measured by one or more sensors in the solution, for example, pH sensor 654. Alternatively, gas flow can be controlled by monitoring cell current that can be used to provide a direct measure of increased production efficiency of the electrolysis cell 620.

It is understood that other control variables may be also used as described above with regard to FIG. 2, including certain variations to the flow-chart 200 as described above.

Figure 8:
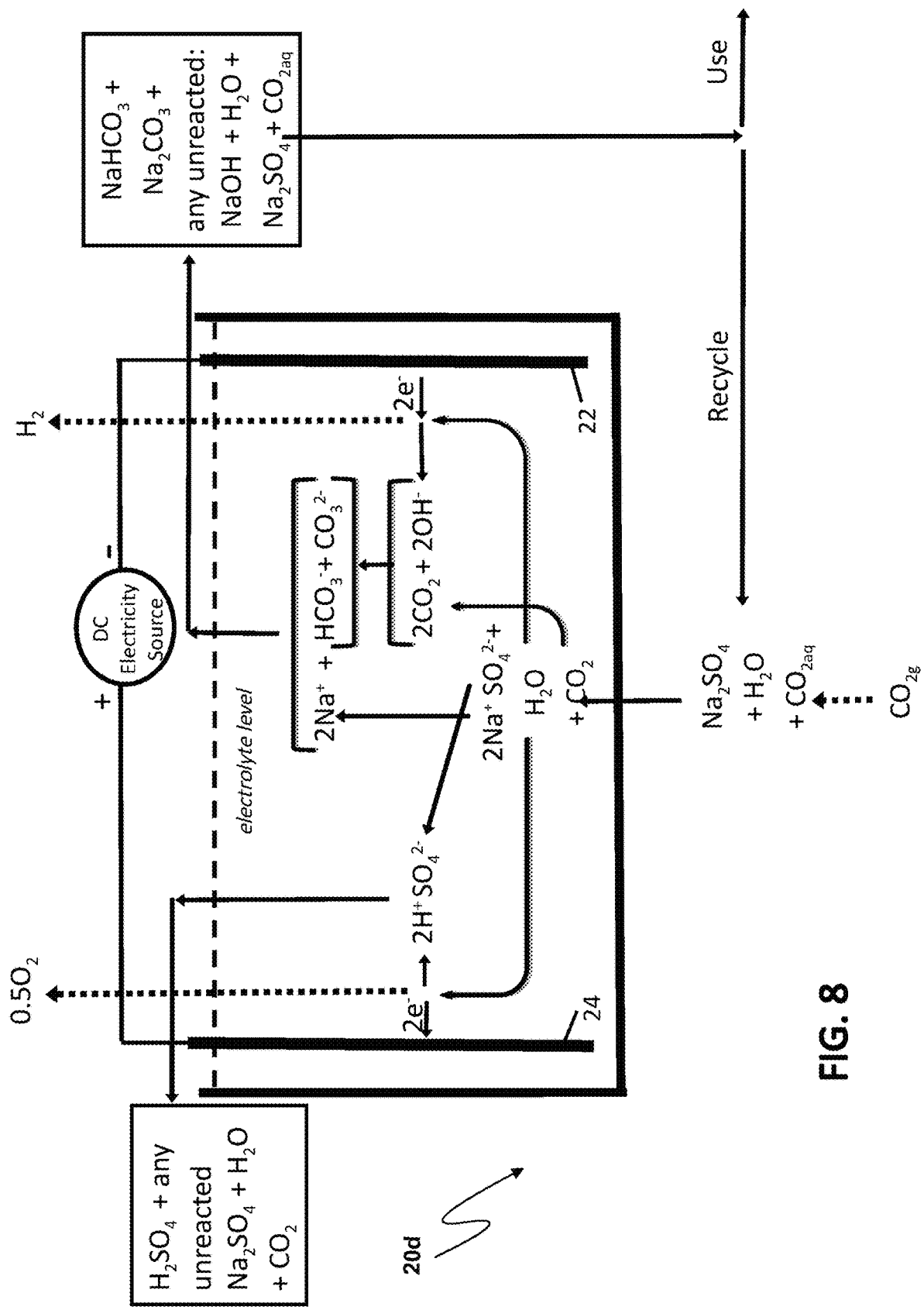
FIG. 8 illustrates yet another arrangement 20d of the electrolysis cell 20, for operation in conjunction with the electrochemical system 600 of FIG. 6.

FIG. 8 illustrates yet another arrangement 20d of the electrolysis cell 20. The electrolysis cell 20d of FIG. 8 is identical to the electrolysis cell 20a of FIG. 3 with the exception that $CO_2$ injection and dissolution now occurs in the salt electrolyte solution prior to introduction of the solution to the electrolysis cell, as described above with regard to FIGS. 6 and 7. In this way $CO_2$ is still introduced to the electrolytic process but without the requirement that $CO_2$ be directly injected into the catholyte of the cell 20d while it resides within the cell 20d. This may simplify the manufacture and operation of such cells and/or allow existing, conventional cells to be adapted to practice the invention.

It is also understood that electrolysis cells of FIGS. 4 and 5 with CEM 54 and AEM 58 may also be used in conjunction with the electrochemical system 700 of FIG. 6.

Figure 9:
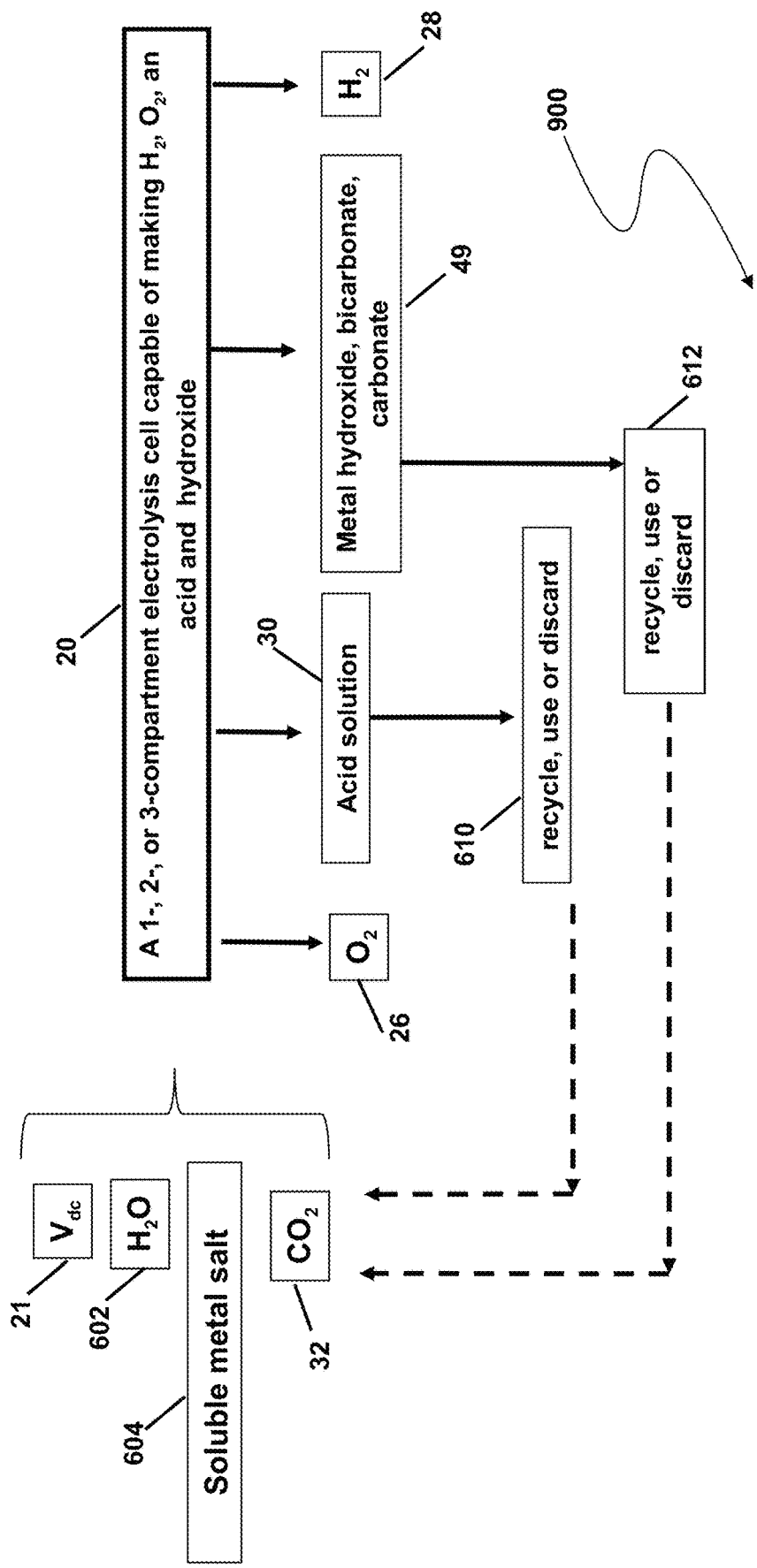
FIG. 9 illustrates a general method of generation and use of products of the electrochemical systems of FIGS. 1 and 6.

The general method of production and use of $H_2$, $O_2$, acid and hydroxide, bicarbonate and/or carbonate is schematically depicted by a diagram 900 in FIG. 9.

In FIG. 9, the electrolysis cell 20 corresponds to the electrolysis cells 20a, 20b, 20c or 20d of FIGS. 3, 4, 5 and 8. The electrolysis cell 20 is supplied with a soluble metal salt 604 and water 602. A direct voltage 21 is applied to the electrodes of the electrolysis cell 20 resulting in the generation of oxygen 26, hydrogen 28, metal hydroxide, bicarbonate, carbonate solution 49 and an acid solution 30. $CO_2$ gas from the $CO_2$ source 32 is injected into the catholyte or the electrolyte as described above with regard to FIGS. 1, 2 and FIGS. 6, 7. Hydrogen and oxygen gases 28, 26 are removed. The removed metal hydroxide, bicarbonate, carbonate solution 49 is used, discarded or recycled back into the electrolysis cell, as required. The removed acid solution 30 is also used, discarded or recycled back into the electrolysis cell, as required.

Thus, the production of a range of chemical products in the electrochemical cell 20 with improved production efficiency has been achieved.

Use of Salts Containing Chlorides

Use of salt electrolytes containing chlorides pose a special case for the preceding embodiments. For example, the electrolysis of an NaCl solution typically results in the formation of $H_2$ gas and $OH^-$ at the cathode 22 and $Cl_2$ gas (rather than $O_2$ gas) at the anode 24. Some acid, HCl and HClO, may still be produced at the anode 24, but this is due to partial hydration in the anolyte of the $Cl_2$ produced: $Cl_2+H_2O \rightarrow HCl+HClO$, Furthermore, in the absence of a barrier to OH— ions (produced at the cathode) and Na+ provided by the electrolyte, the NaOH generated in the catholyte can react with $Cl_2$ to produce sodium chloride and sodium hypochlorite: $Cl_2+2NaOH \rightarrow NaCl+NaClO+H_2O$. So embodiments that use dissolved chloride salt as an electrolyte must use membranes 54 and 58, as shown in FIGS. 4 and 5, or other barriers to ion transport in order to avoid $OH^-$ consumption by $Cl_2$ and maximize the production of hydroxide, bicarbonate and/or carbonate. Alternatively, the $H_2$ gas produced at the cathode 22 can be diverted to react with the $Cl_2$ produced at the anode 24, for example, using a gas diffusion electrode, to consume the $Cl_2$, exothermically forming HCl: $Cl_2+H_2 \rightarrow 2HCl+energy$. This allows for the formation of an acid and an increase in the production efficiency of the electrolysis process, but forgoes the removal and external use of $H_2$, $Cl_2$ and $O_2$.

Modelling Results

The modelling is obtained using the simplified Nernst equation ($E=E°-0.059$ pH). To derive this equation, we can go through the following steps:

$$H_2 \rightarrow 2H^+ + 2e^-$$

$$E = E° + \frac{RT}{2F}\ln\left[\frac{c^2(H^+)}{p(H_2)}\right]$$

$$E = \frac{RT}{F}\ln[c(H^+)]$$

$$E = 2.303\frac{RT}{F}\log[c(H^+)]$$

$$E = -2.303\underbrace{\frac{RT}{F}}_{59mv@25°C}\text{pH; pH} = -\log[c(H^+)]$$

wherein:
R=8.314 J $mol^{-1}$ $K^{-1}$;
F=96485 C $mol^{-1}$;
T=Temperature in K;
c=concentration [mol/l];
$p(H_2)$=saturated vapour pressure [bar];
$p(H_2)$=1 bar/1.013 bar; and
E°=0.0 V.

Figure 10:
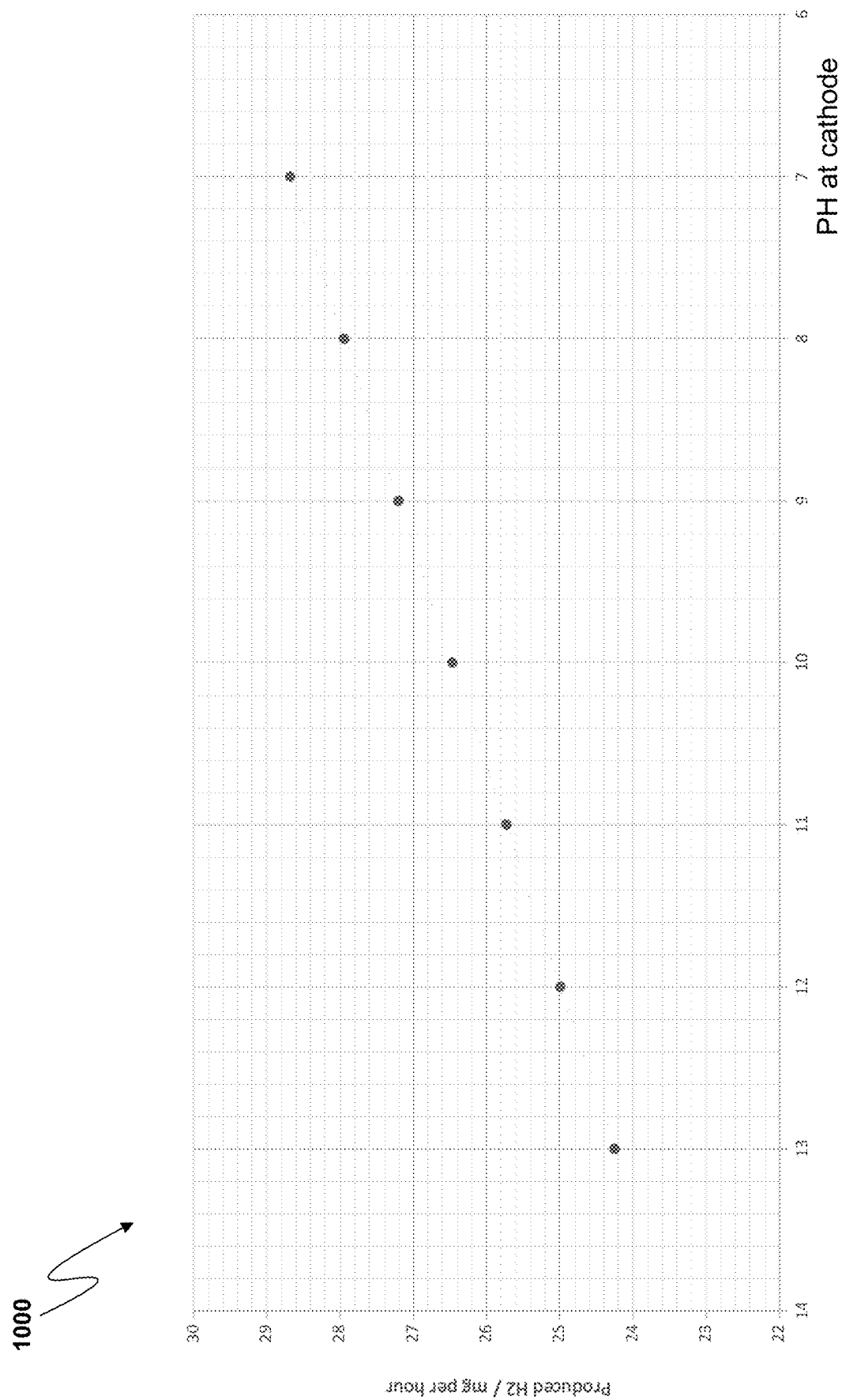
FIG. 10 illustrates modelling of the produced hydrogen in mg per hour as a function of pH at cathode, with the pH at anode being constant and equal to pH=1.

FIG. 10 shows a graph 1000 illustrating results of the modelling of the rate of produced hydrogen in mg per hour as a function of pH at cathode 22, with the pH at anode 24 being constant and equal to pH=1. As seen from the graph 1000, as we decrease the pH at the cathode 22, the cell potential also decreases according to the Nernst equation. The decreased cell potential results in higher current flowing through the electrolysis cell 20, and as a result in more hydrogen gas per unit of consumed energy. The amount of produced hydrogen gas may be extrapolated from the graph 1100.

Figure 11:
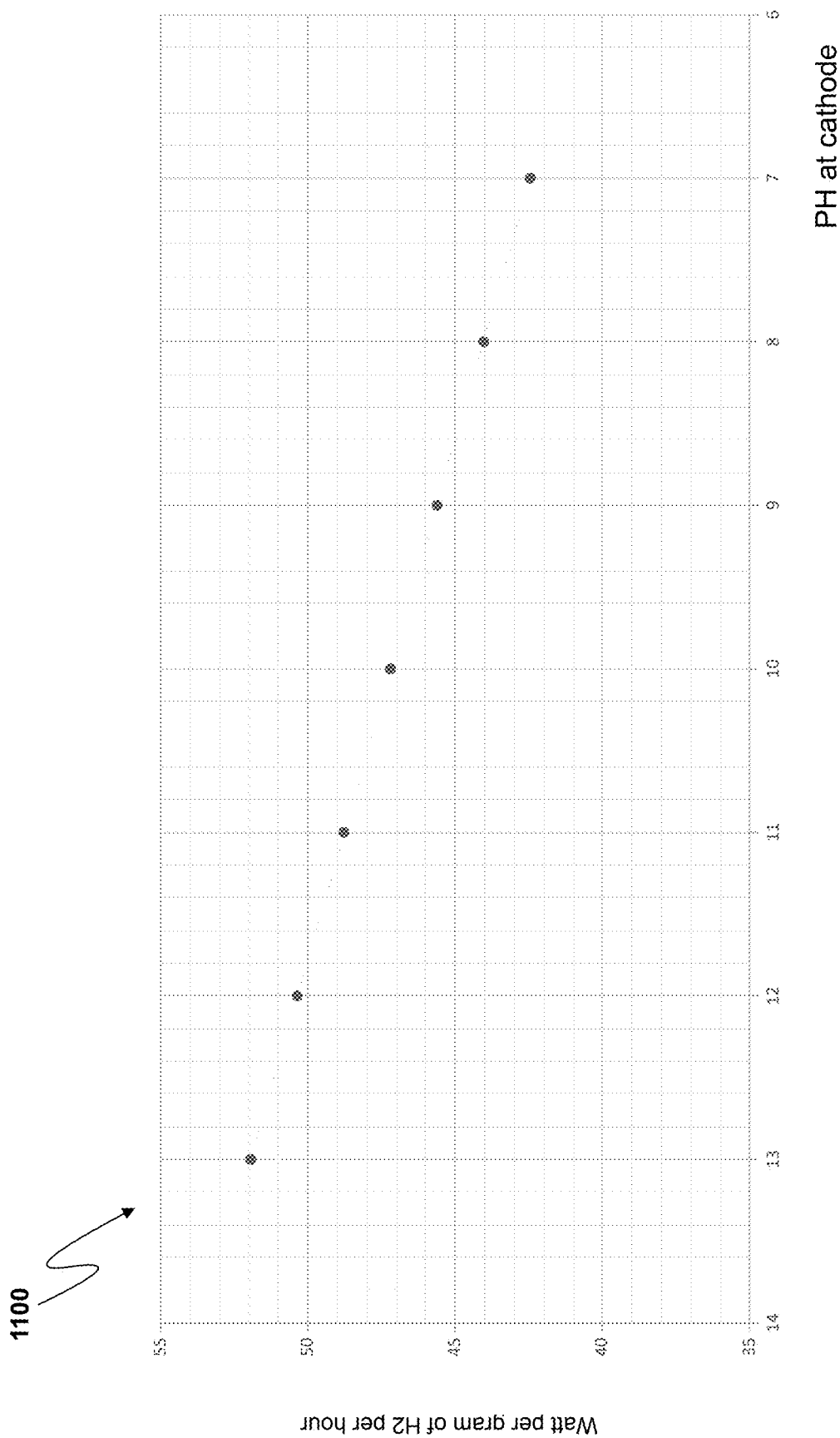
FIG. 11 illustrates modelling of the required power to produce one gram of hydrogen per hour per watt as a function of the pH at cathode, with the pH at anode being constant and equal to pH=1.

FIG. 11 shows a graph 1100 illustrating results of the modelling of the required power to produce one gram of hydrogen per hour per watt as a function of pH at cathode 22, with the pH at anode 24 being constant and equal to pH=1. Graph 1000 demonstrates that we need to consume less power to produce each gram of hydrogen gas in the electrolysis cell as the pH value at the cathode decreases.

Figure 12:
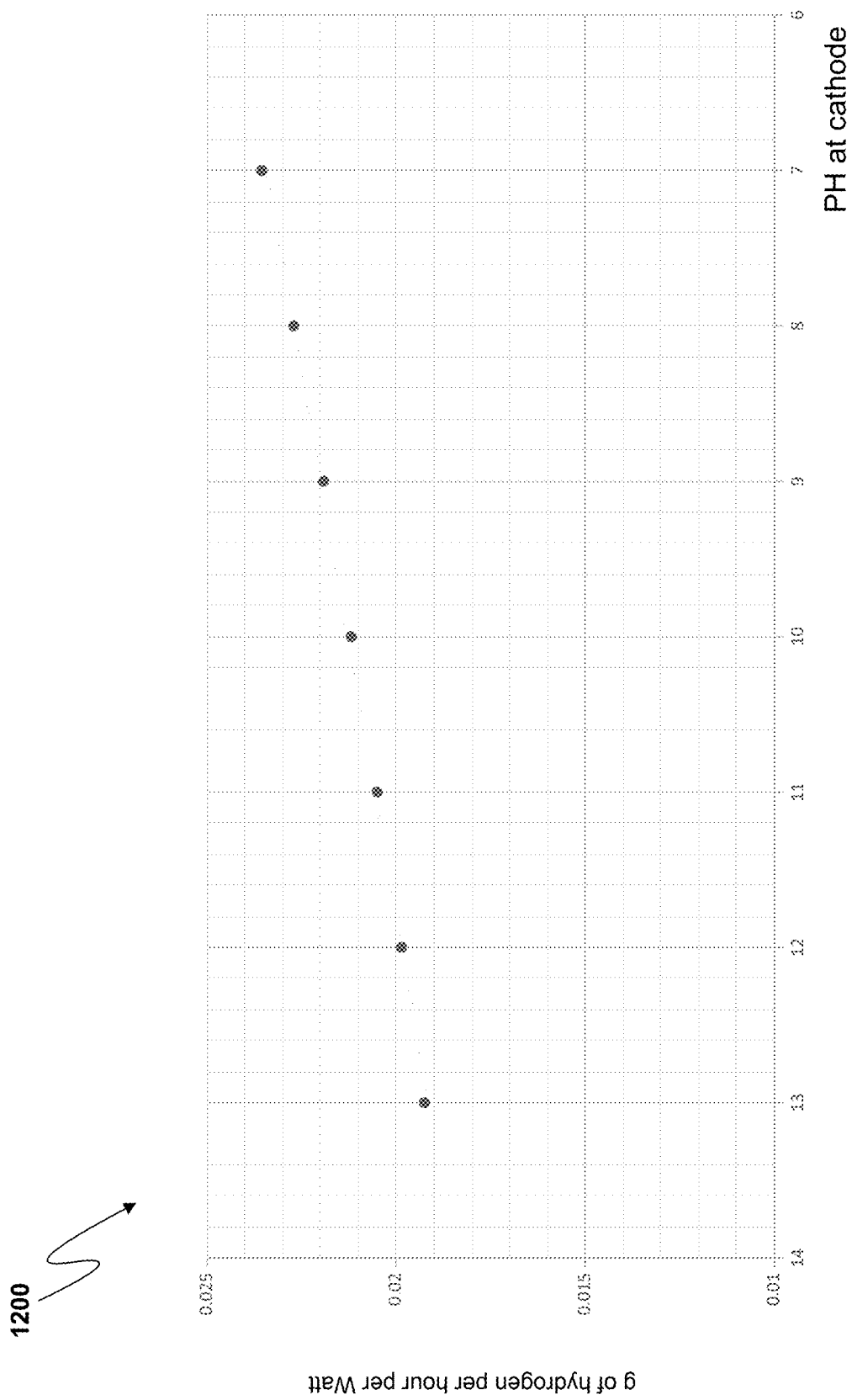
FIG. 12 illustrates modelling of the produced hydrogen gas in grams per hour per unit of consumed power in Watt as a function of the pH at the cathode, with the pH at anode being constant and equal to pH=1.

FIG. 12 shows a graph 1200 illustrating results of the modelling of the produced hydrogen gas in grams per hour per unit of consumed power in Watt as a function of the pH at the cathode 22, with the pH at anode 24 being constant and equal to pH=1. Graph 1200 demonstrates that per unit of spent power, we can have more produced hydrogen. This is due to the fact that according to the Nernst equation, the cell potential decreases by decrease of pH of the catholyte.

Figure 13:
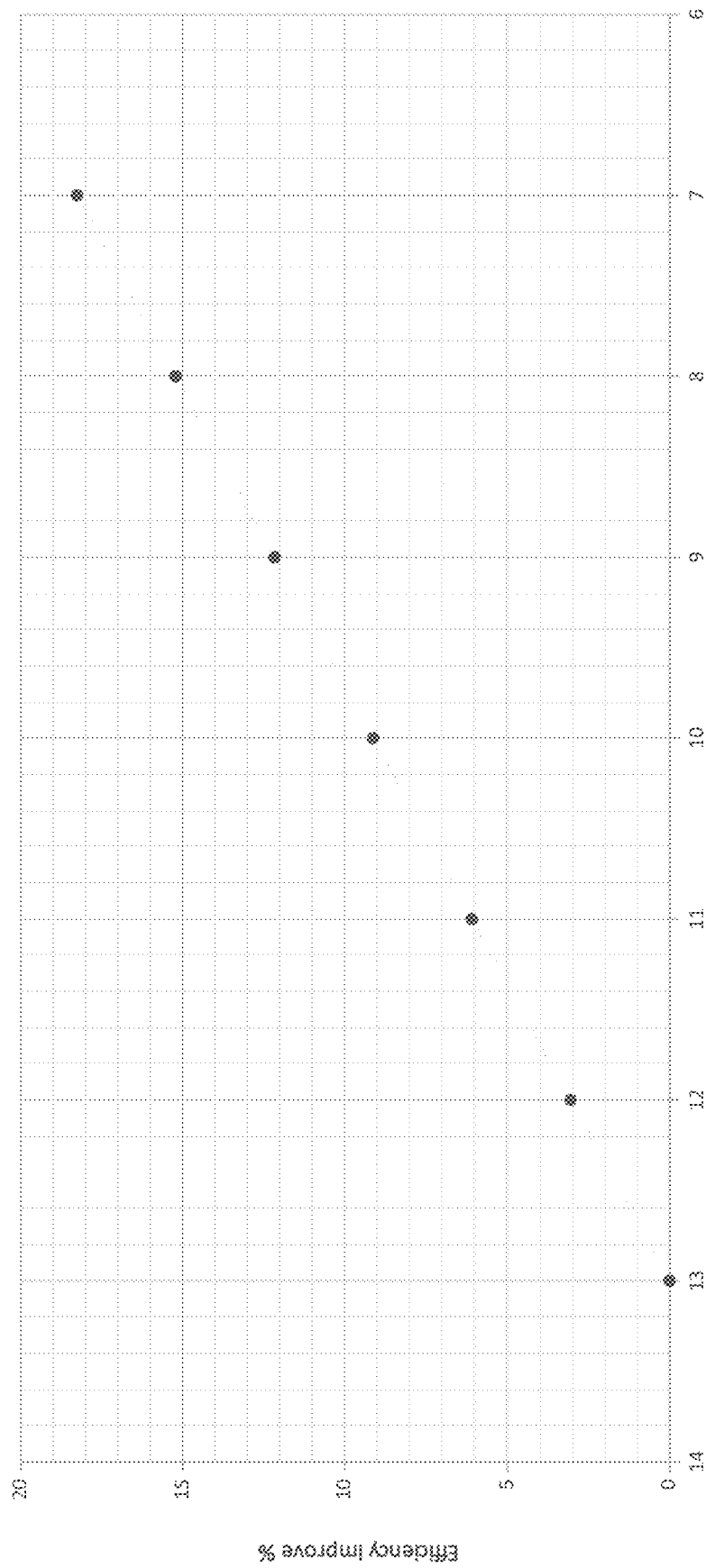
FIG. 13 illustrates modelling of the improved efficiency, in percentage, for the hydrogen production as a function of the pH at the cathode, with the pH at anode being constant and equal to pH=1.

FIG. 13 shows a graph 1300 illustrating results of the modelling of an improved efficiency, in percentage, for the hydrogen production as a function of the pH at the cathode 22, with the pH at anode being constant and equal to pH=1.

Figure 14:
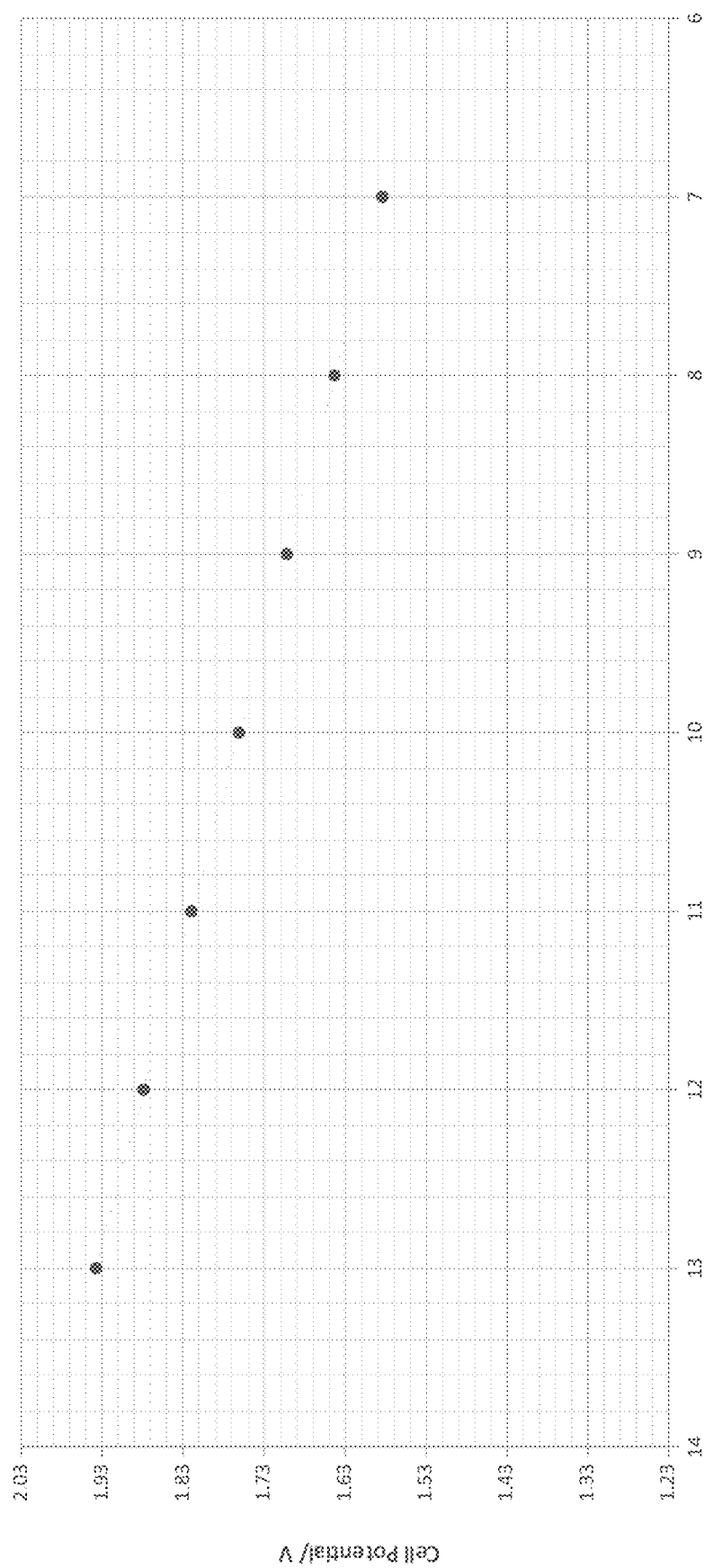
FIG. 14 illustrates modelling of the cell potential in volts as a function of the pH at the cathode, with the pH at anode being constant and equal to pH=1.

FIG. 14 shows a graph 1400 illustrating results of the modelling of the cell potential in volts as a function of the pH at the cathode 22, with the pH at anode being constant and equal to pH=1. This is the base of our calculations for the modelling on the efficiency increase due to the pH decrease using the Nernst equation.

Figure 15:
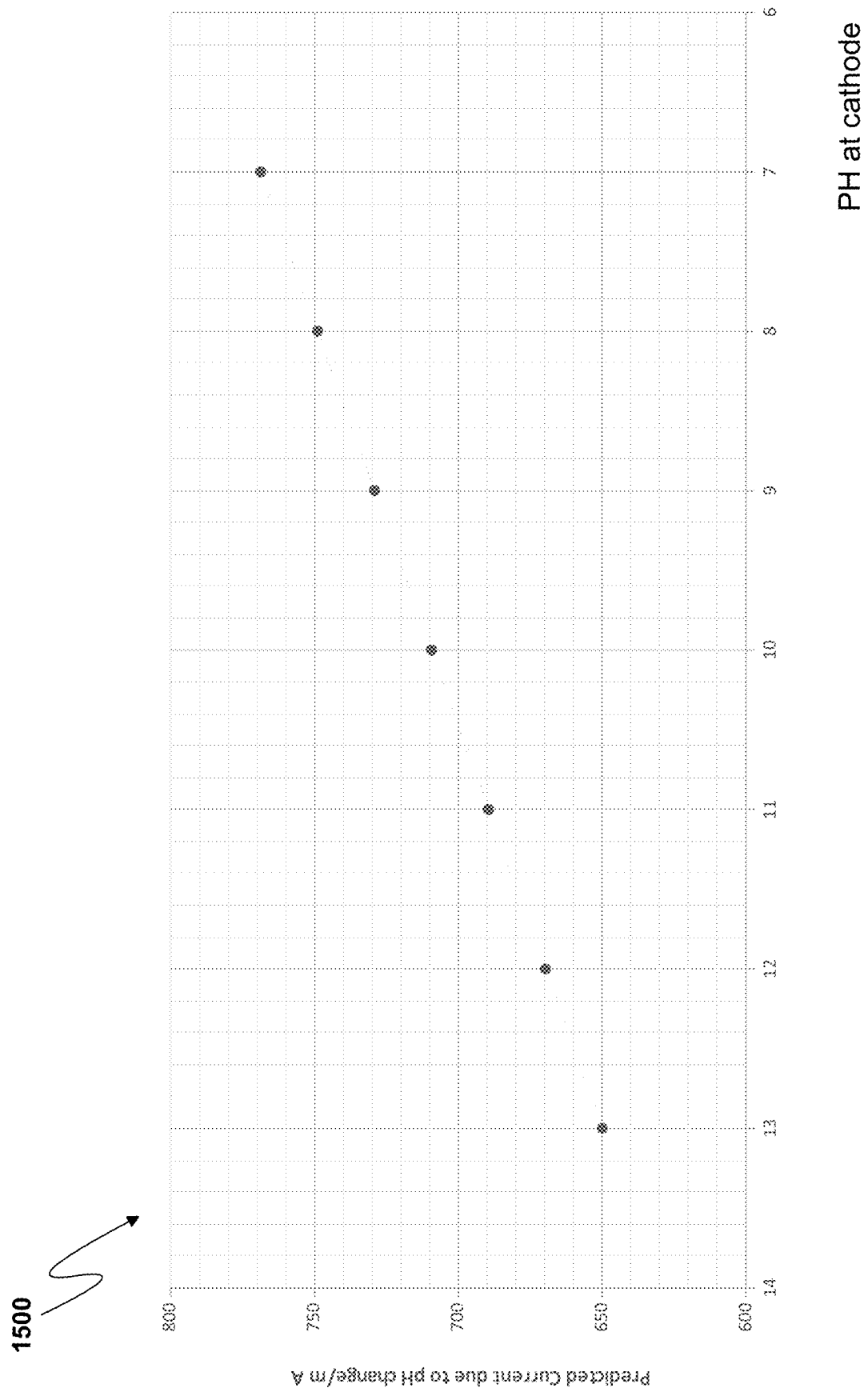
FIG. 15 illustrates modelling of the predicted current values in mA as a function of the pH at the cathode 22, with the pH at anode being constant and equal to pH=1.

FIG. 15 shows a graph 1500 illustrating results of the modelling of the predicted current values in mA as a function of the pH at the cathode 22, with the pH at anode being constant and equal to pH=1. The graph 1500 demonstrates the observed current due to hydrogen production in the cell in the experiment.

Figure 16:
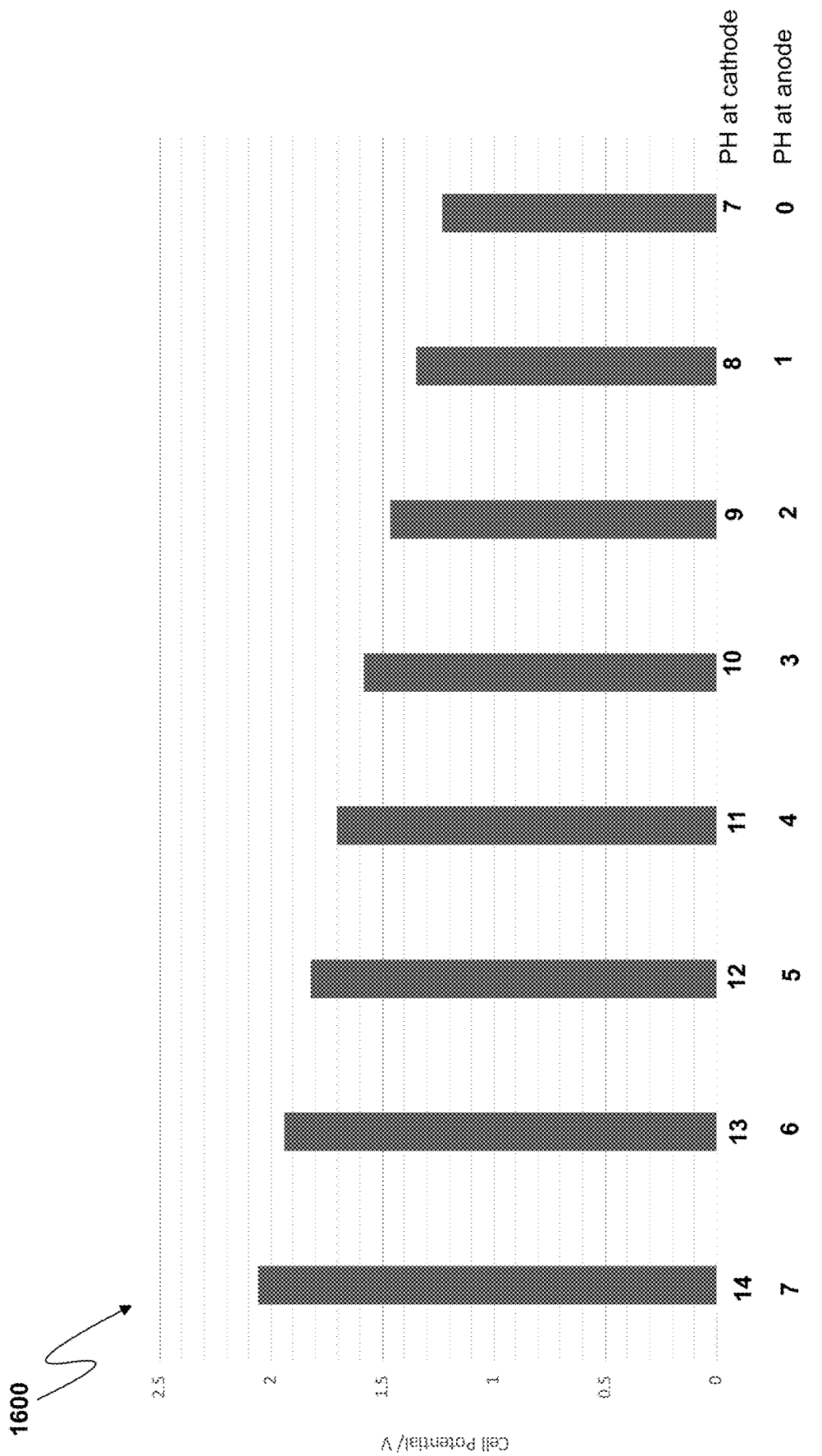
FIG. 16 illustrates modelling of the change of cell potential as a function of the pH at the cathode 22 and the anode 24, with the pH at the cathode ranging from 14 to 7, and the pH at the anode 22 ranging from 0 to 7.

FIG. 16 shows a graph 1600 illustrating results of the modelling of the change of cell potential as a function of the pH at the cathode 22 and the anode 24, with the pH at the cathode ranging from 14 to 7, and the pH at the anode 22 ranging from 0 to 7.

EXPERIMENTAL RESULTS

Experiment #1

A two-compartment electrochemical water electrolyser system has been used in a configuration of FIG. 4. 0.5 N Na2SO4 solution has been used as the electrolyte. The current values were recorded, with the potential of 3.0 V being applied. Once the current values reached to its steady state condition and the pH in catholyte was above pH=12, $CO_2$ gas was purged into the catholyte until the alkalinity in the cathode 22 neutralized and the pH went down to about below 7. The sudden change/increase of the current value was observed.

Figure 17:
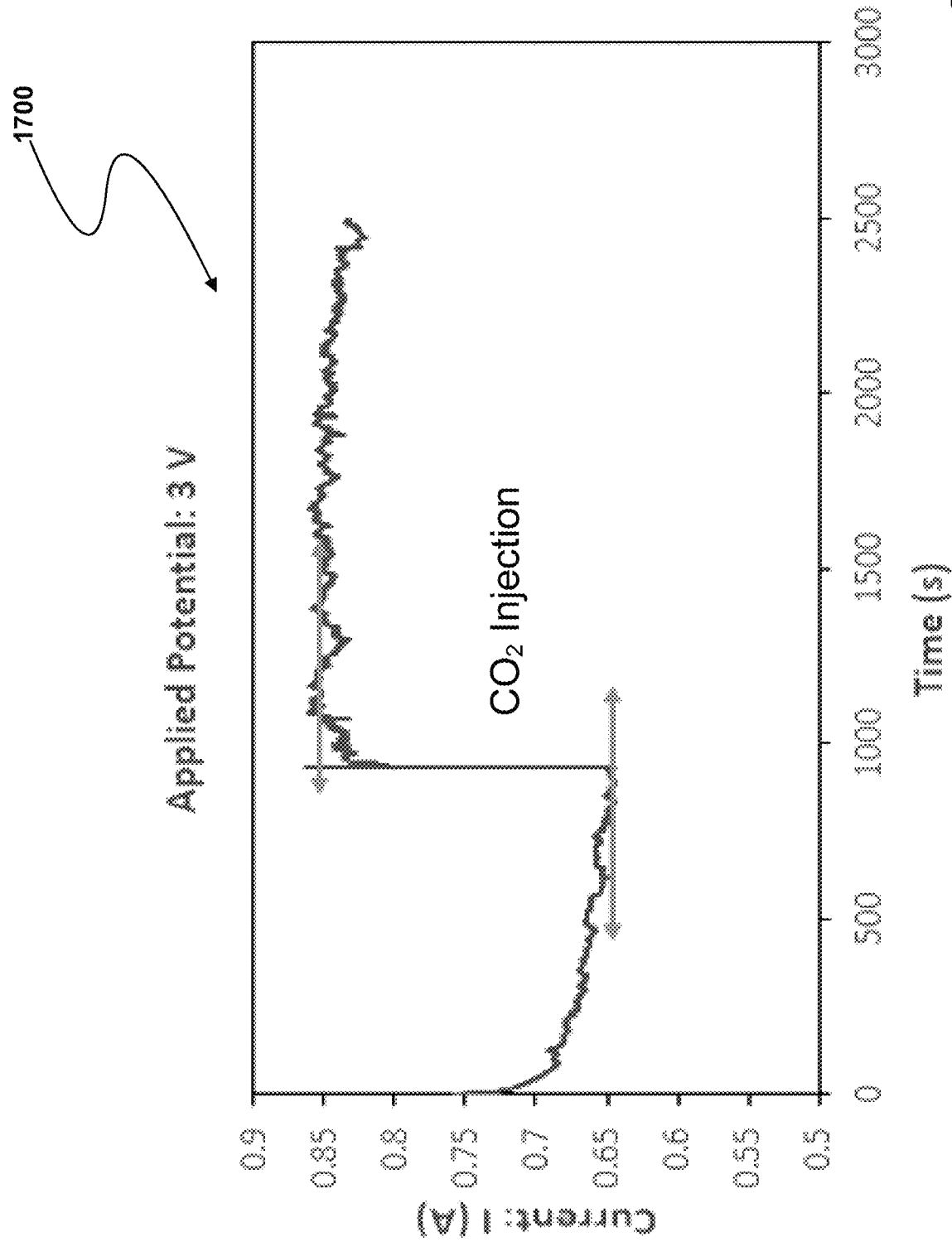
FIG. 17 shows experimental results illustrating a sudden increase of the current from about 0.65 A to about 0.85 A.
Figure 18:
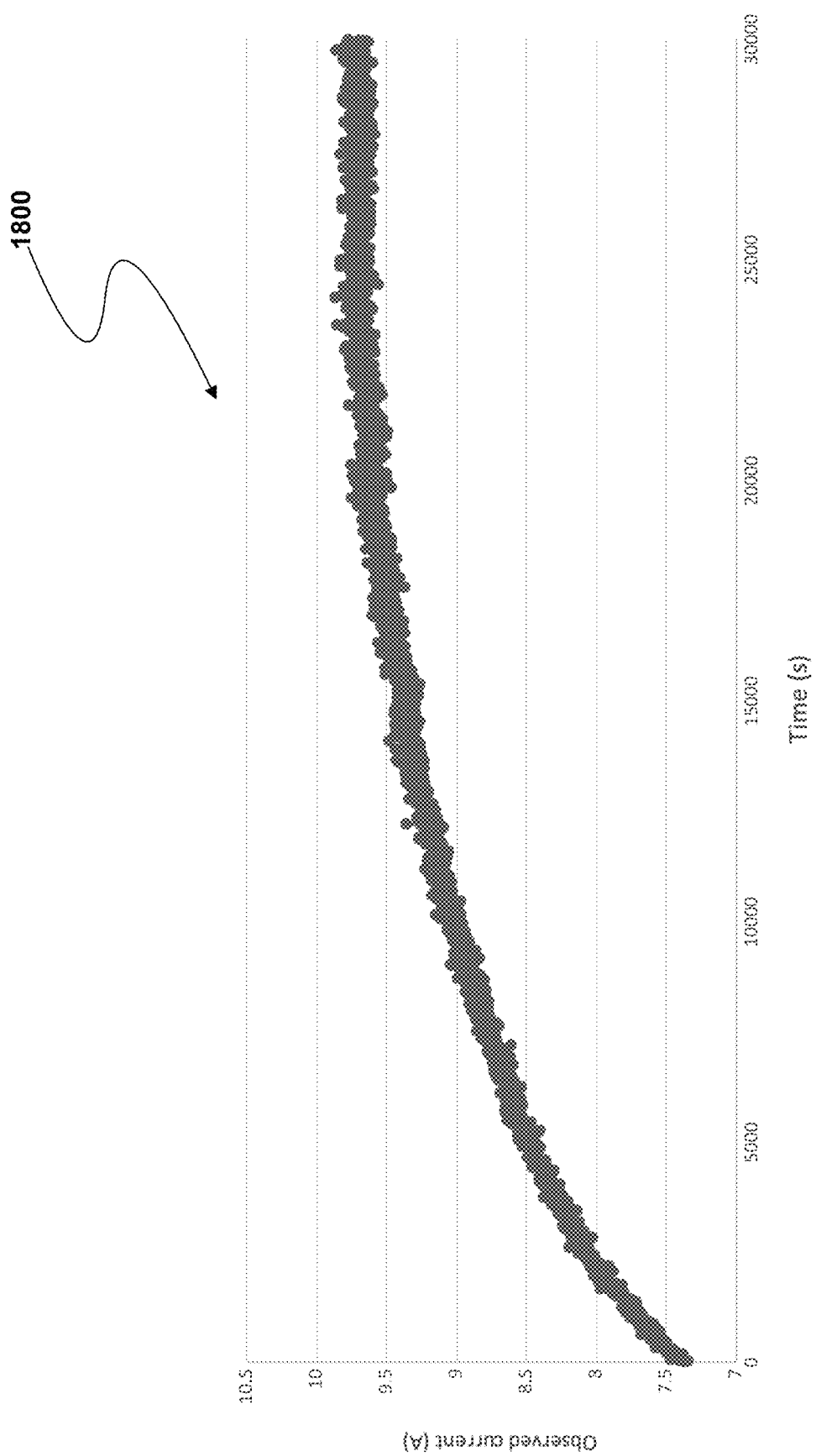
FIG. 18 shows experimental results illustrating current in the electrolysis cell in the presence of continuous injection of the $CO_2$ gas into the catholyte.

Experimental results are shown in FIG. 17 in the form of the graph 1700, showing a sudden increase of the current from about 0.65 A to about 0.85 A, or about 30.7%.

Experimental results of FIG. 17 are consistent with the results of modelling illustrates in FIG. 15.

This improvement is due to concurrently happening of (i) a decrease of the cell potential due to decrease of the pH (the $CO_2$ gas introduced into the catholyte neutralizes the hydroxide ions, and the pH drops), and (ii) a decrease of the minimum work as $CO_2$ is introduced into the catholyte solution.

In another experiment (not shown in the drawings), 0.25 M $Na_2SO_4$ solution was electrolyzed using 3 V (DC power), both in the presence and in the absence of the added $CO_2$ (100% $CO_2$ was bubbled into the catholyte). It was observed that in the presence of the $CO_2$ gas the pH of the catholyte went down from about pH=13-14 (without the addition of $CO_2$ gas) to about below pH=9 (after the addition of the $CO_2$ gas into the catholyte). The injection of the $CO_2$ gas would decrease the global work function and thus, would increase the cell production efficiency.

Experiment #2

A two-compartment electrochemical water electrolyser system has been used similar to FIG. 4. 0.5 N Na2SO4 solution has been used as the electrolyte. The current values have been recorded as the potential of 6.0 V has been applied. The electrolysis cell continued working at this condition for one hour. Salt splitting has been done at the applied potential of 6 V, and the current has stabilized at an average value of about 7.3 A, with the pH in the catholyte being about pH=12.6.

When the pH in the catholyte has reached above pH=12, the $CO_2$ gas has been purged into the catholyte until the alkalinity in the cathode chamber 34 has been neutralized, and the pH of about pH=7-8 has been reached.

In the next step, another experiment has been conducted. The same potential of 6V has been applied, and the current values have been recorded over time to monitor the influence of the long term bubbling of the $CO_2$ gas into the catholyte.

Once the pH has reached in the scale of below (ca. 7.5), the salt splitting has started again using similar applied potential of 6V, but the $CO_2$ gas has been continuously injected into the catholyte to observe the influence of the long-term injections of the $CO_2$ gas on the production efficiency of the cell. It has been observed that the current has increased from about 7.3 A in the absence of the $CO_2$ purging to about 9.7 A in the presence of the $CO_2$ purging, thus resulting in about 25% improvement in the production efficiency of the electrolysis cell.

This experiment proves that the equilibrium is achieved after a continuous bubbling of the $CO_2$ into the catholyte. The improvement in the production efficiency of the electrolysis cell is due to the fact that having $CO_2$ in the solution is changing the work function values. Please refer to the explanations below regarding the influence of the introduction of the $CO_2$ gas on the minimum work.

The production efficiency of the electrolysis cell may be explained in the following functional terms.

If the voltage of the DC source is maintained constant, the reaction with the $CO_2$ gas increases conductivity of the electrolyte and decreases resistance of the electrolyte, thus the current is increased. As a result, the power consumption of the electrolysis cell with the $CO_2$ gas injected, is also increased (increased current×constant voltage). As a result of the increased power consumption, more hydrogen is produced (per minute) by the electrolysis cell 20 per volt of cell potential applied.

In this explanation, there is no energy saving, and instead the cell consumes more energy and accordingly produces more hydrogen. There no increase in power or energy efficiency as explained above, only with respect to voltage. Thus, we can get more product without having to increase cell voltage potential.

The relative fractional increase in production rate with CO2 use is simply A(co2)/A(no co2), assuming V is the same for both. If voltages are not the same then it's [A(co2)/V(co2)]/[A(no Co2)/V(no Co2)].

As discussed above, the electrical resistance as well as sub-optimal chemical conditions within an electrolysis cell increase resistance of the electrolysis cell and hence, increase the production efficiency of the cell. As discussed above, the $CO_2$ gas is directly added to the catholyte, which then reacts with the $OH^-$ produced in the catholyte, thus, lowering catholyte pH and increasing energy efficiency of the cell.

The preceding neutralization of produced $OH^-$ by $CO_2$ and hence the lowering of catholyte pH and the increase in cell energy efficiency proceeds via one or both of these reactions:

$$Na^+ + OH^- + CO_2 \rightarrow NaHCO_3$$

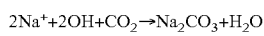

$$2Na^+ + 2OH^- + CO_2 \rightarrow Na_2CO_3 + H_2O$$

where the $NaHCO_3$ and/or $Na_2CO_3$ is in solid or more preferably soluble form so as to more easily be removed from the cell and to avoid precipitation of solids within the cell.

The mixture of $NaHCO_3$ and $Na_2CO_3$ produced will be determined by the pH of the solution, with $Na_2CO_3$ being favored at high pH. It is also understood that the cations other than Na+ may balance the hydroxide, carbonate and/or bicarbonate anions, as dictated by the cations originally present in the catholyte. In any case the process transforms gaseous $CO_2$ into stable, dissolved or solid bicarbonate/carbonate forms, thus effectively removing and sequestering at least some of the $CO_2$ from the original gas stream. When the preceding gas stream is composed of waste gas that otherwise would enter the atmosphere, the invention's removal and sequestration of some or all of the $CO_2$ would serve to beneficially reduce $CO_2$ emission to the atmosphere. When the gas stream is air, the $CO_2$ removal and sequestration achieved directly and beneficially reduces the $CO_2$ burden in the atmosphere. The bicarbonate and/or carbonate produced can provide long term sequestration, either in solid or dissolved form and may have further commercial or environmental uses. For example these compounds can be added to the ocean to help beneficially neutralize and counter the effects of ocean acidification while also providing long-term carbon sequestration from the atmosphere. Another benefit of the invention is that it provides an effective method of neutralizing the $OH^-$ and lowering the produced solution's pH, thus reducing the environmental impact of its disposal in the event that the $OH^-$ produced has no other use. In the following, the thermodynamics behind the process as well as influence of $CO_2$ reaction with hydroxide ions on the thermodynamics of the hydrogen evolution reaction is discussed as the theoretical points of view:

Basic Reactions:

| reaction: | $H_2O$ ----> | $H_2$ + | $0.5O_2$ |
|---|---|---|---|
| kJ/mol | −237.1 | 0 | 0 |
| mass, g. | 18 | 2 | 16 |
| g/g $H_2$ | 9 | 1 | 8 |
| ΔG kJ | 237.1 | 0 | 0 | minimum work, 237.1 KJ/mol $H_2$

Standard $Na_2SO_4$ Splitting:

| reaction: $3H_2O + Na_2SO_4$ ----> $2NaOH + H_2SO_4 + H_2 + 0.5\ O_2$ | | | | | | |
|---|---|---|---|---|---|---|
| kJ/mol | −237.1 | −1266.8 | −374.1 | 690.1 | 0 | 0 |
| mass, g. | 54 | 142 | 80 | 98 | 2 | 16 |
| g/g H2 | 27 | 71 | 40 | 49 | 1 | 8 |
| ΔG kJ | −711.4 | −1266.8 | −748.3 | 690.1 | 0 | 0 | minimum work, 539.9 KJ/mol $H_2$

Assuming Fully Neutralizing the Produced NaOH with Purged $CO_2$ to Produce $NaHCO_3$(aq):

| reaction: $3H_2O + Na_2SO_4 + 2CO_2$ ----> $2NaHCO_3 + H_2SO_4 + H_2 + 0.5\ O_2$ | | | | | | |
|---|---|---|---|---|---|---|
| kJ/mol | −237.1 | −1266.8 | −394.4 | −851.9 | 690.1 | 0 | 0 |
| mass, g. | 54 | 142 | 88 | 168 | 98 | 2 | 16 |
| g/g H2 | 27 | 71 | 44 | 84 | 49 | 1 | 8 |
| ΔG kJ | −711.4 | −1266.8 | −788.8 | −1703.7 | 690.1 | 0 | 0 | minimum work. 373.2 KJ/mol $H_2$

The comparison of this result with 539.9 KJ/mol $H_2$ (minimum work without reacting with $CO_2$), indicates a 31.5% improvement in energy efficiency.

ADVANTAGES

The embodiments of the present invention provide the following advantages:

1) Increased production efficiency in electrolytically producing $H_2$, $O_2$ (or $Cl_2$), acid, and some mixture of hydroxide, bicarbonate and carbonate;
2) Beneficial consumption of $CO_2$ and sequestration of that $CO_2$ from the atmosphere; and
3) Production of hydroxide, bicarbonate and/or carbonate that can have industrial, agricultural, environmental uses.

Although specific embodiments of the invention have been described in detail, it should be understood that the described embodiments are intended to be illustrative and not restrictive. Various changes and modifications of the embodiments shown in the drawings and described in the specification may be made within the scope of the following claims without departing from the scope of the invention in its broader aspect.

The invention claimed is:

1. A method of controlling an operation of an electrolysis cell to achieve an improved production efficiency of the electrolysis cell, the method comprising:
    defining a production efficiency of the electrolysis cell as a quantity of a product produced per unit of time per watt of power used by the electrolysis cell, the product being selected from the group consisting of a gas formed at the cathode, a gas formed at the anode, acid, a carbonate, and a bicarbonate;
    determining a dependence of the production efficiency as a function of a control variable of the electrolysis cell;
    controlling the operation of the electrolysis cell, comprising:
        introducing a $CO_2$ gas into an electrolyte of the electrolysis cell containing $OH^-$ ions at a rate resulting in a reduced pH level of the electrolyte, but not exceeding a rate leading to a total consumption of the $OH^-$ ions, the $CO_2$ gas reacting with the $OH^-$ ions to form one or more of the bicarbonate and carbonate;
        varying the rate of introducing the $CO_2$ gas so as to achieve a value of the control variable corresponding to an improved predetermined production efficiency in accordance with said dependence;
    and
        operating the electrolysis cell under the improved predetermined production efficiency until an exit condition is met;
        thereby improving the production efficiency of the electrolysis cell while sequestering the $CO_2$ gas.

2. The method of claim 1, wherein the varying further comprises varying the rate of introducing the $CO_2$ gas so as to keep values of the control variable between a minimal and maximal thresholds.

3. The method of claim 1, wherein the control variable is one or more of the following:
    pH level of a catholyte in the cathode area inside the electrolysis cell;
    PH level of a catholyte removed from the cathode area of the electrolysis cell;
    pH level of the electrolyte of the electrolysis cell;
    current of the electrolysis cell;
    concentration of the $CO_2$ in a gas stream;
    concentration of $CO_2$ in the catholyte;
    concentration of $CO_2$ in the catholyte removed from the cathode area of the electrolysis cell; and
    concentration of $CO_2$ in the electrolyte.

4. The method of claim 1, wherein the introducing the $CO_2$ gas into the electrolyte comprises introducing the $CO_2$ gas into a catholyte in a cathode area of the electrolysis cell.

5. The method of claim 1, wherein the introducing the $CO_2$ gas into the electrolyte comprises introducing the $CO_2$ gas into an electrolyte prior to introduction of the electrolyte into the electrolysis cell.

6. The method of claim 1, wherein the operating comprises conducting saline water electrolysis, with saline water containing a salt dissolved in water, the dissolved salt being selected from the group of salts whose ions consist of:
  ammonium, calcium, iron, magnesium, potassium, sodium, or copper cations; and
  bicarbonate, carbonate, chloride, nitrate, phosphate, or sulfate anions.

7. The method of claim 1, wherein the operating comprises conducting saline water electrolysis, with saline water containing a salt dissolved in water, the dissolved salt containing one or more of the following:
  sodium sulfate; sodium nitrate; sodium phosphate, sodium carbonate; potassium sulfate; potassium nitrate; potassium phosphate; potassium carbonate.

8. The method of claim 1, wherein the introducing comprises contacting the catholyte with a gas stream containing $CO_2$.

9. The method of claim 1, wherein the reduced pH level is from about pH=14 to about pH=7.

10. The method of claim 1, wherein the reduced pH level is from about pH=11 to about pH=9.

11. The method of claim 1, wherein the product is selected from the group consisting of $H_2$, $O_2$, $Cl_2$, an acid, bicarbonate, carbonate.

12. The method of claim 1, wherein:
  the operating comprises conducting the electrolysis in the electrolysis cell having at least one ion-exchange membrane disposed between cathode and anode and defining a cathode area and an anode area; and
  the introducing comprises introducing the $CO_2$ gas into the cathode area in close proximity to the cathode.

13. The method of claim 1, wherein:
  the operating comprises conducting the electrolysis in the electrolysis cell having a cation exchange membrane and an anion exchange membrane disposed in the electrolysis cell between cathode and anode and defining a cathode area, an anode area, and a central area therebetween; and
  the introducing comprises introducing the $CO_2$ gas into one or more of the cathode area and the central area.

14. The method of claim 1, wherein the $CO_2$ gas is derived from one or more of the following: the atmosphere; a waste stream; biomass; soil; the ocean; a fossil source.

15. The method of claim 1, wherein the production efficiency of the electrolysis cell is increased up to about 30%.

16. An apparatus for controlling an operation of an electrolysis cell for achieving an improved production efficiency of the electrolysis cell, the apparatus comprising:
  a means for obtaining a dependence of a production efficiency of the electrolysis cell as a function of a control variable of the electrolysis cell, the production efficiency being defined as a quantity of a product produced per unit of time per watt of power used by the electrolysis cell, the product being selected from the group consisting of a gas formed at a cathode, a gas formed at an anode, an acid, a carbonate, and a bicarbonate;
  a means for introducing $CO_2$ gas into an electrolyte of the electrolysis cell containing $OH^-$ ions at a rate resulting in a reduced pH level of the electrolyte, but not exceeding a rate leading to total consumption of the $OH^-$ ions, the $CO_2$ gas reacting with the $OH^-$ ions to form one or more of the bicarbonate and carbonate;
  a means for varying the rate of introducing the $CO_2$ gas so as to achieve a value of the control variable corresponding to an improved predetermined production efficiency in accordance with said dependence; and
  a means for operating the electrolysis cell under the improved predetermined efficiency until an exit condition is met;
  thereby improving the production efficiency of the electrolysis cell while sequestering the $CO_2$ gas.

17. The apparatus of claim 16, wherein the means for varying are further configured to vary the rate of introducing the $CO_2$ gas so as to keep values of the control variable between a minimal and maximal thresholds.

18. The apparatus of claim 16, wherein the means for introducing comprises one of the following:
  a means for introducing the $CO_2$ gas into a catholyte in a cathode area of the electrolysis cell;
  a means for introducing the $CO_2$ gas into the electrolyte prior to introduction of the electrolyte into the electrolysis cell.

19. The apparatus of claim 16, wherein the electrolysis cell contains saline water having a salt dissolved therein, the salt being selected from the group of salts whose ions consist of:
  ammonium, calcium, iron, magnesium, potassium, sodium, or copper cations; and
  bicarbonate, carbonate, chloride, nitrate, phosphate, or sulfate anions.

20. The apparatus of claim 16, wherein the electrolysis cell contains saline water having a salt dissolved therein, the salt containing one or more of the following:
  sodium sulfate; sodium nitrate; sodium phosphate, sodium carbonate; potassium sulfate; potassium nitrate; potassium phosphate; potassium carbonate.

21. The apparatus of claim 16, wherein the reduced pH level is one of the following:
  from about pH=14 to about pH=7;
  from about pH=12 to about pH=8;
  from about pH=11 to about pH=9;
  from about pH=10 to about pH=7.

22. The apparatus of claim 16, wherein the product is selected from the group consisting of $H_2$, $O_2$, $Cl_2$, an acid, bicarbonate, and carbonate.

23. The apparatus of claim 16, wherein:
  the electrolysis cell has at least one ion-exchange membrane disposed between the cathode and the anode and defining a cathode area and an anode area respectively; and
  the means for introducing is configured to introduce the $CO_2$ gas into the cathode area in close proximity to the cathode.

24. The apparatus of claim 16, wherein the production efficiency of the electrolysis cell is increased up to about 30%.

25. An electrolysis cell with an improved production efficiency and sequestration of the $CO_2$ gas, configured to:
  obtain a dependence of a production efficiency of the electrolysis cell as a function of a control variable of the electrolysis cell, the production efficiency being defined as a quantity of a product produced per unit of time per watt of power used by the electrolysis cell, the product being selected from the group consisting of a gas formed at the cathode, a gas formed at the anode, acid, a carbonate, and a bicarbonate;
  introduce a $CO_2$ gas into an electrolyte of the electrolysis cell containing $OH^-$ ions at a rate resulting in a reduced pH level of the electrolyte, but not exceeding a rate leading to total consumption of the $OH^-$ ions, the $CO_2$ gas reacting with the $OH^-$ ions to form one or more of the bicarbonate and carbonate;

and
vary the rate of introducing the $CO_2$ gas so as to achieve a value of the control variable corresponding to an improved predetermined production efficiency in accordance with said dependence;

thereby improving the production efficiency of the electrolysis cell while sequestering the $CO_2$ gas.

\* \* \* \* \*